(12) United States Patent
Cao et al.

(10) Patent No.: US 12,092,865 B2
(45) Date of Patent: Sep. 17, 2024

(54) GRATING AND GRATING CHARACTERISTIC ADJUSTMENT METHOD AND DEVICE

(71) Applicant: HUAWEI TECHNOLOGIES CO., LTD., Guangdong (CN)

(72) Inventors: Shiyi Cao, Shenzhen (CN); Zhiwu Chang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/071,485

(22) Filed: Nov. 29, 2022

(65) Prior Publication Data
US 2023/0093290 A1   Mar. 23, 2023

Related U.S. Application Data

(63) Continuation of application No. PCT/CN2021/093868, filed on May 14, 2021.

(30) Foreign Application Priority Data

May 30, 2020   (CN) .......................... 202010480709.1

(51) Int. Cl.
*G02B 6/12*   (2006.01)
(52) U.S. Cl.
CPC ..... *G02B 6/12033* (2013.01); *G02B 6/12016* (2013.01); *G02B 2006/12164* (2013.01)
(58) Field of Classification Search
CPC .................................................. G02B 6/12033
See application file for complete search history.

(56) References Cited

U.S. PATENT DOCUMENTS 3,870,397 A * 3/1975 Dillon, Jr. ............... G02F 1/313
                                                            385/6
4,442,414 A * 4/1984 Carter .................... G01C 19/68
                                                          356/469
(Continued)

FOREIGN PATENT DOCUMENTS

CN       101303423 A       11/2008
CN       103091783 A   *    5/2013
(Continued)

OTHER PUBLICATIONS

Office Action in Chinese Appln. No. 202010480709.1, dated Mar. 16, 2022, 12 pages (with English translation).
(Continued)

*Primary Examiner* — Michael Stahl
(74) *Attorney, Agent, or Firm* — Fish & Richardson P.C.

(57) ABSTRACT

Example gratings, grating characteristic adjustment methods and devices are provided. One example grating includes a first optical waveguide region, a second optical waveguide region, and an arrayed waveguide region comprising a plurality of optical waveguides, where the first optical waveguide region is connected to the arrayed waveguide region, and the second optical waveguide region is connected to the arrayed waveguide region. The grating has at least one of the following characteristics: a refractive index of an optical waveguide in the first optical waveguide region can be changed, a refractive index of an optical waveguide in the second optical waveguide region can be changed, a refractive index of an optical waveguide in the arrayed waveguide region can be changed, or an optical waveguide in an arrayed waveguide region can be eliminated.

12 Claims, 15 Drawing Sheets

S501

A grating management device obtains a target value of a grating characteristic

S502

The grating management device performs processing on a grating based on the target value of the grating characteristic to cause any one or more of the following changes of the grating: a change of a refractive index of an optical waveguide in a target waveguide region and elimination of some optical waveguides in an arrayed waveguide region

(56) References Cited

U.S. PATENT DOCUMENTS

| | | | | |
|---|---|---|---|---|
| 5,559,906 | A | * | 9/1996 | Maerz ............... G02B 6/12033 385/40 |
| 6,360,036 | B1 | * | 3/2002 | Couillard ............. G02B 6/3596 398/82 |
| 6,853,773 | B2 | * | 2/2005 | Lin .................... G02B 6/12033 385/39 |
| 7,330,659 | B2 | * | 2/2008 | Doerr ................ G02B 6/12007 359/559 |
| 2004/0062512 | A1 | * | 4/2004 | Pawlowski .......... H04B 10/291 385/37 |
| 2004/0136645 | A1 | * | 7/2004 | Dingel ................ G02B 6/3514 385/24 |
| 2005/0111775 | A1 | * | 5/2005 | Fridman ................ G02F 1/035 385/129 |
| 2006/0126992 | A1 | * | 6/2006 | Hashimoto ........ G02B 6/12009 385/14 |
| 2019/0331941 | A1 | * | 10/2019 | Coolbaugh ............. G02F 1/095 |

FOREIGN PATENT DOCUMENTS

| | | | |
|---|---|---|---|
| CN | 105589506 | A | 5/2016 |
| CN | 107479217 | A * | 12/2017 |
| CN | 107688210 | A | 2/2018 |
| CN | 104991309 | B | 10/2018 |
| CN | 110196467 | A | 9/2019 |
| CN | 110596914 | A | 12/2019 |
| EP | 2341378 | A1 * | 7/2011 |
| IN | 106019474 | B | 8/2019 |
| JP | 2013152496 | A | 8/2013 |
| JP | 5469030 | B2 | 4/2014 |
| JP | 2016-161845 | A * | 9/2016 |

OTHER PUBLICATIONS

International Search Report and Written Opinion in International Appln. No. PCT/CN2021/093868, mailed on Aug. 19, 2021, 21 pages (with English translation).

Liu, "Development Status of Grating Application," Journal of Changsha University, vol. 23, No. 5, Sep. 2009, 6 pages (with English abstract).

* cited by examiner

Period of a current arrayed waveguide region: $d = d_i = d_0 = x$, and length difference between two adjacent optical waveguides in the current arrayed waveguide region: $\Delta L = y$ Period of a current arrayed waveguide region: $d = d_i = d_0 = 2x$, and length difference between two adjacent optical waveguides in the current arrayed waveguide region: $\Delta L = 2y$

GRATING AND GRATING CHARACTERISTIC ADJUSTMENT METHOD AND DEVICE

CROSS-REFERENCE TO RELATED APPLICATIONS

This application is a continuation of International Application No. PCT/CN2021/093868, filed on May 14, 2021, which claims priority to Chinese Patent Application No. 202010480709.1, filed on May 30, 2020. The disclosures of the aforementioned applications are hereby incorporated by reference in their entireties.

TECHNICAL FIELD

This application relates to the field of optical communication technologies, and in particular, to a grating and a grating characteristic adjustment method and device.

BACKGROUND

In the field of optical communication technologies, a wavelength demultiplexing module and a wavelength multiplexing module are important modules in a wavelength division network, and are mainly used for an optical terminal multiplexer (OTM) station. The wavelength demultiplexing module is mainly configured to split one optical signal with a relatively large quantity of frequency components (referred to as a multiplexed optical signal for short) into at least one optical signal with different main frequency components (referred to as a demultiplexed optical signal for short). A function of the wavelength multiplexing module is opposite to that of the wavelength demultiplexing module, and is mainly configured to multiplex at least one optical signal with different main frequency components into one optical signal with a relatively large quantity of frequency components.

The wavelength demultiplexing module and the wavelength multiplexing module are mainly implemented by using a grating, for example, an arrayed waveguide grating (AWG).

Currently, an optical waveguide forming an AWG is made of silicon oxide or a silicon material, and an optical transmission parameter of the optical waveguide is fixed. Therefore, a channel spacing (or a spectral width of an input diffraction peak or a spectral width of an output diffraction peak) of the AWG is also fixed.

Currently, gratings with various channel spacings are commonly used in wavelength division networks, for example, a grating with a channel spacing of 50 GHz, a grating with a channel spacing of 62.5 GHz, a grating with a channel spacing of 75 GHz, and a grating with a channel spacing of 100 GHz.

It is clearly that, to satisfy such a requirement of a plurality of channel spacings, a grating manufacturer needs to manufacture one type of grating based on each channel spacing, leading to relatively high manufacturing costs and maintenance costs.

SUMMARY

This application provides a grating and a grating characteristic adjustment method and device, to adjust a characteristic of the grating, thereby reducing manufacturing costs and maintenance costs of the grating.

According to a first aspect, an embodiment of this application provides a grating, where the grating includes a first optical waveguide region, a second optical waveguide region, and an arrayed waveguide region including a plurality of optical waveguides, the first optical waveguide region is connected to the arrayed waveguide region, and the second optical waveguide region is connected to the arrayed waveguide region; and the grating has any one or any combination of the following characteristics: a refractive index of an optical waveguide in the first optical waveguide region can be changed, a refractive index of an optical waveguide in the second optical waveguide region can be changed, a refractive index of an optical waveguide in the arrayed waveguide region can be changed, and an optical waveguide in the arrayed waveguide region can be eliminated.

Because the grating has the foregoing characteristics, a grating management device may perform processing on the grating to change a refractive index of an optical waveguide in a target waveguide region and/or eliminate some optical waveguides in the arrayed waveguide region. In this case, at least one of a channel spacing, a spectral width of an input diffraction peak, and a spectral width of an output diffraction peak of the grating is changed, and finally a characteristic of the grating is changed. Further, manufacturing costs and maintenance costs of the grating can be reduced during production and using of the grating.

In a possible design, when the grating implements the any one or any combination of the characteristics, any one or more of the channel spacing of the grating, the spectral width of the input diffraction peak of the grating, and the spectral width of the output diffraction peak of the grating are changed, thereby implementing grating characteristic adjustment.

In a possible design, the grating is an arrayed waveguide grating.

In a possible design, the first optical waveguide region is any one of an input free transmission waveguide region, an input slab waveguide region, or an input star coupling region in the grating, and the second optical waveguide region is any one of an output free transmission waveguide region, an output slab waveguide region, or an output star coupling region in the grating.

In a possible design, an optical waveguide in any one or any combination of the first optical waveguide region, the second optical waveguide region, and the arrayed waveguide region is made of a liquid crystal material.

In a possible design, the grating further includes a groove layer; a groove corresponding to the optical waveguide in the any one or any combination of the first optical waveguide region, the second optical waveguide region, and the arrayed waveguide region is etched at the groove layer; and the groove layer is configured to form a coating layer of the optical waveguide in the any one or any combination of the first optical waveguide region, the second optical waveguide region, and the arrayed waveguide region.

In a possible design, the grating further includes a control component, and the control component is configured to change the refractive index of the optical waveguide in the target waveguide region and/or eliminate some optical waveguides in the arrayed waveguide region.

Based on this design, the grating management device can implement the foregoing changes by controlling the control component.

In a possible design, the control component is an electrode layer, and the electrode layer is configured to provide a voltage or an electric field, so that the grating implements at least one of the following changes: a change of the refractive index of the optical waveguide in the target waveguide region and elimination of some optical waveguides in the arrayed waveguide region.

Based on this design, the grating can implement the foregoing changes by changing the voltage or the electric field.

In a possible design, the electrode layer includes any one or any combination of the following:

an electrode region corresponding to the optical waveguide in the first optical waveguide region, an electrode region corresponding to the optical waveguide in the second optical waveguide region, and an electrode region corresponding to the optical waveguide in the arrayed waveguide region.

Based on this design, the grating management device can flexibly adjust a refractive index of an optical waveguide in each waveguide region. When refractive indexes of optical waveguides in different optical waveguide regions need to be set to different values, the grating management device may supply, based on different voltages, power to electrode regions corresponding to the optical waveguides in the different waveguide regions.

In a possible design, the grating further includes a cladding layer, and the cladding layer is configured to seal the liquid crystal material. Based on this design, the optical waveguide located in the groove can be prevented from being exposed to air.

In a possible design, the cladding layer is also used as a ground layer of an electrode at the electrode layer.

In a possible design, the control component is a magnetic pole layer, and the magnetic pole layer is configured to provide a magnetic field, so that the grating implements at least one of the following changes: a change of the refractive index of the optical waveguide in the target waveguide region and elimination of some optical waveguides in the arrayed waveguide region.

Based on this design, the grating can implement the foregoing changes by changing the magnetic field.

In a possible design, the magnetic pole layer includes any one or any combination of the following:

a magnetic pole region corresponding to the optical waveguide in the first optical waveguide region, a magnetic pole region corresponding to the optical waveguide in the second optical waveguide region, and a magnetic pole region corresponding to the optical waveguide in the arrayed waveguide region.

Based on this design, the grating management device can flexibly control a refractive index of an optical waveguide in any waveguide region in the grating. When refractive indexes of optical waveguides in different optical waveguide regions need to be set to different values, the grating management device may adjust, based on different magnetic field strengths, magnetic fields of magnetic pole regions corresponding to the optical waveguides in the different waveguide regions.

According to a second aspect, an embodiment of this application provides an optical add/drop multiplexer, including an optical cross-connect array or an optical switch array, and at least one grating provided in the first aspect. The at least one grating is connected to the optical cross-connect array or the optical switch array.

According to a third aspect, an embodiment of this application provides a grating characteristic adjustment method. A grating is provided with a first optical waveguide region, a second optical waveguide region, and an arrayed waveguide region including a plurality of optical waveguides, the first optical waveguide region is connected to the arrayed waveguide region, and the second optical waveguide region is connected to the arrayed waveguide region. Steps of the method are described below:

A grating management device obtains a target value of a grating characteristic, where the grating characteristic includes any one or more of a channel spacing, a spectral width of an input diffraction peak, and a spectral width of an output diffraction peak; and then performs, based on the target value of the grating characteristic, processing on the grating to cause any one or more of the following changes of the grating: a change of a refractive index of an optical waveguide in a target waveguide region and elimination of some optical waveguides in the arrayed waveguide region. The target waveguide region is any one or any combination of the first optical waveguide region, the second optical waveguide region, or the arrayed waveguide region.

According to this method, the grating management device may process, based on the target value of the grating characteristic, a control component in the grating to cause at least one of the following changes of the grating: the change of the refractive index of the optical waveguide in the target waveguide region and elimination of some optical waveguides in the arrayed waveguide region. In this way, the grating management device can change the grating characteristic.

In a possible design, the grating further includes a control component. The grating management device may perform processing on the grating according to the following step based on the target value of the grating characteristic:

processing the control component based on the target value of the grating characteristic to cause the any one or more of the following changes of the grating: the change of the refractive index of the optical waveguide in the target waveguide region and elimination of some optical waveguides in the arrayed waveguide region.

In a possible design, the control component is an electrode layer; the processing, by the grating management device, the control component based on the target value of the grating characteristic includes:

supplying power to the electrode layer based on the target value of the grating characteristic to enable the electrode layer to provide a voltage or an electric field to the grating, thereby causing the foregoing changes of the grating.

In a possible design, when the change of the grating includes the change of the refractive index of the optical waveguide in the target waveguide region, the supplying, by the grating management device, power to the electrode layer based on the target value of the grating characteristic includes:

determining a target refractive index of the target waveguide region based on the target value of the grating characteristic;

determining a target voltage of the electrode layer based on the target refractive index of the target waveguide region; and supplying power to the electrode layer based on the target voltage to enable the electrode layer to provide a voltage or an electric field to the target waveguide region in the grating.

In a scenario in which the grating management device stores a first correspondence between each value of the grating characteristic and a target refractive index of each target waveguide region, regardless of which channel spacing the grating is adjusted to or which value the grating characteristic of the grating is adjusted to, the grating management device may determine, based on the first correspondence, at least one target waveguide region whose refractive index needs to be changed and the target refractive index of each target waveguide region. In this way, the grating management device can adjust a refractive index of the target waveguide region to the corresponding target refractive index by changing the voltage of the electrode layer.

In a possible design, in a scenario in which the grating management device stores a second correspondence between a grating characteristic adjustment manner (adjusting from an original value to a target value) and a target refractive index of each target waveguide region, the grating management device may determine, based on the original value of the grating characteristic, the target value of the grating characteristic, and the second correspondence, at least one target waveguide region whose refractive index needs to be changed and the target refractive index of each target waveguide region. In this way, the grating management device can adjust a refractive index of the target waveguide region to the corresponding target refractive index by changing the voltage of the electrode layer.

In a possible design, when the electrode layer includes an electrode region corresponding to each optical waveguide in the plurality of waveguide regions, the grating management device may determine, based on the target refractive index of each target waveguide region, a target voltage of an electrode region corresponding to an optical waveguide in each target waveguide region. In this way, the grating management device can supply, based on the target voltage of the electrode region corresponding to the optical waveguide in each target waveguide region, power to the electrode region corresponding to the optical waveguide in each target waveguide region, so that the optical waveguide in each target waveguide region is affected by a corresponding voltage or electric field, and finally a refractive index of the optical waveguide in each target waveguide region is adjusted to a corresponding target refractive index.

In a possible design, when the change of the grating includes elimination of some optical waveguides in the arrayed waveguide region, the supplying, by the grating management device, power to the electrode layer based on the target value of the grating characteristic includes:
  determining a target value of a structure parameter of the arrayed waveguide region based on the target value of the grating characteristic;
  determining, based on the target value of the structure parameter of the arrayed waveguide region, some optical waveguides that need to be eliminated from the arrayed waveguide region; and
  supplying power to the electrode layer based on a preset voltage to enable the electrode layer to provide a voltage or an electric field to the some optical waveguides in the grating.

Based on this design, the grating management device can supply power to the electrode layer based on the preset voltage to enable the electrode layer to provide the voltage or the electric field to the some optical waveguides in the grating, thereby finally causing the some optical waveguides to disappear.

In a scenario in which the grating management device stores a third correspondence between each value of the grating characteristic and a value of a structure parameter of the arrayed waveguide region, the grating management device may directly determine a target value of the structure parameter of the arrayed waveguide region based on the target value of the grating characteristic.

In a scenario in which the grating management device stores a fourth correspondence between a grating characteristic adjustment manner (adjusting from an original value to a target value) and a value of a structure parameter of the arrayed waveguide region, the grating management device may determine, based on the original value of the grating characteristic and the target value of the grating characteristic, a target value of the structure parameter of the arrayed waveguide region.

In a possible design, the electrode layer includes an electrode region corresponding to an optical waveguide in the arrayed waveguide region; and
  the grating management device may supply, based on the preset voltage, power to an electrode region that is at the electrode layer and that is corresponding to the some optical waveguides, to enable the electrode region to provide a voltage or an electric field to the some optical waveguides.

Based on this design, the grating management device can flexibly eliminate a specified optical waveguide.

In a possible design, the control component is a magnetic pole layer, and the processing, by the grating management device, the control component based on the target value of the grating characteristic includes:
  adjusting a magnetic field strength of the magnetic pole layer based on the target value of the grating characteristic to enable the magnetic pole layer to provide a magnetic field to the grating, thereby causing the foregoing changes of the grating.

In a possible design, when the change of the grating includes the change of the refractive index of the optical waveguide in the target waveguide region, the adjusting, by the grating management device, a magnetic field strength of the magnetic pole layer based on the target value of the grating characteristic includes:
  determining a target refractive index of the target waveguide region based on the target value of the grating characteristic;
  determining a target magnetic field strength of the magnetic pole layer based on the target refractive index of the target waveguide region; and
  adjusting the magnetic field strength of the magnetic pole layer to the target magnetic field strength to enable the magnetic pole layer to provide a magnetic field to the target waveguide region in the grating, thereby finally causing a refractive index of the target waveguide region to be changed to the target refractive index.

In a possible design, when the magnetic pole layer includes a magnetic pole region corresponding to each optical waveguide in the plurality of waveguide regions, the grating management device may determine, based on the target refractive index of each target waveguide region, a target magnetic field strength of a magnetic pole region corresponding to an optical waveguide in each target waveguide region. In this way, the grating management device can adjust, based on the target magnetic field strength of the magnetic pole region corresponding to the optical waveguide in each target waveguide region, a magnetic field strength of the magnetic pole region corresponding to the optical waveguide in each target waveguide region, so that the optical waveguide in each target waveguide region is affected by the corresponding magnetic field strength, and finally a refractive index of the optical waveguide in each target waveguide region is adjusted to a corresponding target refractive index.

In a possible design, when the change of the grating includes elimination of some optical waveguides in the arrayed waveguide region, the adjusting, by the grating management device, a magnetic field strength of the magnetic pole layer based on the target value of the grating characteristic includes:

determining, by the grating management device, a target value of a structure parameter of the arrayed waveguide region (for example, a periodicity d of the arrayed waveguide region and/or a length difference $\Delta L$ between two adjacent optical waveguides in the arrayed waveguide region) based on the target value of the grating characteristic;

determining, by the grating management device based on the target value of the structure parameter of the arrayed waveguide region, some optical waveguides in the arrayed waveguide region that need to be eliminated; and adjusting, by the grating management device, the magnetic field strength of the magnetic pole layer to a preset magnetic field strength to enable the magnetic pole layer to provide a magnetic field to the some optical waveguides in the grating, thereby finally causing the some optical waveguides to disappear. The magnetic field corresponding to the preset magnetic field strength can cause the some optical waveguides to disappear.

Based on this design, the grating management device can flexibly eliminate a specified optical waveguide.

In a possible design, the control component is a temperature control layer, and the processing, by the grating management device, the control component based on the target value of the grating characteristic includes:

adjusting a temperature of the temperature control layer based on the target value of the grating characteristic to enable the temperature control layer to provide a temperature to the grating, thereby causing the foregoing changes of the grating.

In a possible design, when the change of the grating includes the change of the refractive index of the optical waveguide in the target waveguide region, the adjusting, by the grating management device, a temperature of the temperature control layer based on the target value of the grating characteristic includes:

determining a target refractive index of the target waveguide region based on the target value of the grating characteristic;

determining a target temperature of the temperature control layer based on the target refractive index of the target waveguide region; and adjusting the temperature of the temperature control layer to the target temperature to enable the temperature control layer to provide the temperature to the target waveguide region in the grating, thereby finally causing the refractive index of the target waveguide region to be changed to the target refractive index.

In a possible design, when the temperature control layer includes a temperature control region corresponding to each optical waveguide in the plurality of waveguide regions, the grating management device may determine, based on the target refractive index of each target waveguide region, a target temperature of a temperature control region corresponding to the optical waveguide in each target waveguide region. In this way, the grating management device can adjust a temperature of the temperature control region corresponding to the optical waveguide in each target waveguide region to the target temperature corresponding to the temperature control region, so that the optical waveguide in each target waveguide region is affected by the corresponding temperature, and finally a refractive index of the optical waveguide in each target waveguide region is adjusted to a corresponding target refractive index.

In a possible design, when the change of the grating includes elimination of some optical waveguides in the arrayed waveguide region, the adjusting, by the grating management device, a temperature of the temperature control layer based on the target value of the grating characteristic includes:

determining, by the grating management device, a target value of a structure parameter of the arrayed waveguide region (for example, a periodicity d of the arrayed waveguide region and/or a length difference $\Delta L$ between two adjacent optical waveguides in the arrayed waveguide region) based on the target value of the grating characteristic;

determining, by the grating management device based on the target value of the structure parameter of the arrayed waveguide region, the some optical waveguides in the arrayed waveguide region that need to be eliminated; and adjusting, by the grating management device, the temperature of the temperature control layer to a preset temperature to enable the temperature control layer to provide the preset temperature to the some optical waveguides in the grating, thereby finally causing the some optical waveguides to disappear. The preset temperature can cause the some optical waveguides to disappear.

Based on this design, the grating management device can flexibly eliminate a specified optical waveguide. According to a fourth aspect, an embodiment of this application provides a grating management device, including units configured to perform the steps in the third aspect.

According to a fifth aspect, an embodiment of this application provides a grating management device, including at least one processing element and at least one storage element. The at least one storage element is configured to store a program and data. The at least one processing element is configured to read and execute the program and the data stored in the storage element, so that the method provided in the third aspect of this application is implemented.

According to a sixth aspect, an embodiment of this application further provides a computer program. When the computer program runs on a computer, the computer is enabled to perform the method provided in the third aspect.

According to a seventh aspect, an embodiment of this application further provides a computer-readable storage medium. The computer-readable storage medium stores a computer program. When the computer program is executed by a computer, the computer is enabled to perform the method provided in the third aspect.

According to an eighth aspect, an embodiment of this application further provides a chip. The chip is configured to read a computer program stored in a memory, to perform the method provided in the third aspect.

According to a ninth aspect, an embodiment of this application further provides a chip system. The chip system includes a processor, configured to support a computer apparatus in implementing the method provided in the third aspect. In a possible design, the chip system further includes a memory, and the memory is configured to store a program

DESCRIPTION OF EMBODIMENTS

This application provides a grating and a grating characteristic adjustment method and device, to adjust a characteristic of the grating, thereby reducing manufacturing costs and maintenance costs of the grating. The method and the device are based on a same inventive concept. Because problem-resolving principles of the method and the device are similar, mutual reference may be made to implementations of the device and the method, and repeated content is not described again.

In the following, some terms in this application are described, to help a person skilled in the art have a better understanding.

(1) Grating: A grating is an optical device for implementing wavelength demultiplexing or wavelength multiplexing on an optical signal. The grating can be widely applied to the field of optical communication technologies due to its wavelength demultiplexing and wavelength multiplexing functions. For example, types of gratings may include, but are not limited to, an AWG and a rotating AWG.

The following provides a description by using an AWG as an example.

Figure 1:
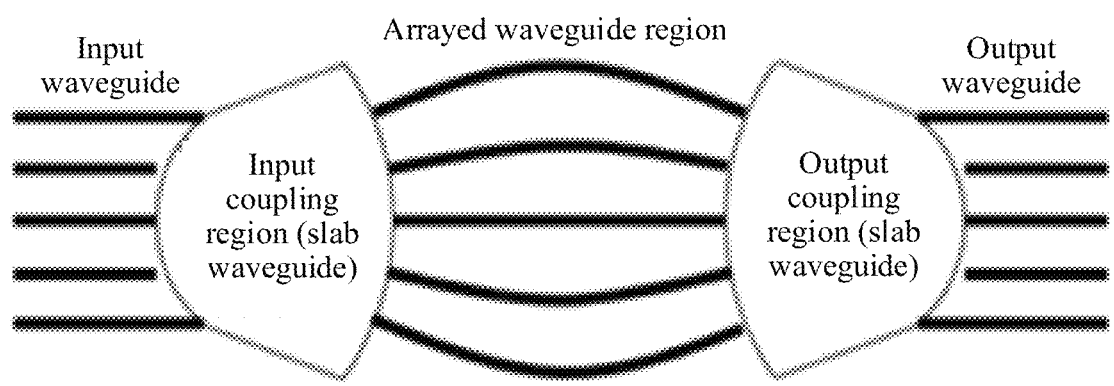
FIG. 1 is a schematic diagram of a structure of a general AWG according to an embodiment of this application.

As shown in FIG. 1, an AWG mainly includes several parts: an input waveguide, an input coupling region, an arrayed waveguide region, an output coupling region, and an output waveguide. The input coupling region is also referred to as an input free transmission waveguide region, an input slab waveguide region, or an input star coupling region. For ease of description, the regions are collectively referred to as input coupling regions below. The output coupling region is also referred to as an output free transmission waveguide region, an output slab waveguide region, or an output star coupling region. For ease of description, the regions are collectively referred to as output coupling regions below. The input coupling region and the output coupling region use similar structures each including a concave grating and a Rowland circle. Ports of the input waveguide and the output waveguide are located on circumferences of the Rowland circles, and the arrayed waveguide region is located on circumferences of the concave gratings. The input waveguide and the output waveguide each limit and conduct an optical signal; and a relatively large optical path difference is introduced in the arrayed waveguide region to make the grating work in higher-order diffraction, thereby improving resolution of the grating.

It should be noted that, some structure parameters of the AWG need to satisfy a grating equation and an angular dispersion equation, to implement a wavelength demultiplexing or wavelength multiplexing function of the AWG.

The grating equation satisfies Formula 1:

$$n_{si}*d_i*\sin\theta_i + n_c*\Delta L + n_{so}*d_o*\sin\theta_o = m*\lambda \qquad \text{Formula 1}$$

where $n_{si}$ represents a refractive index of (an optical waveguide in) the input coupling region, $n_{so}$ represents a refractive index of (an optical waveguide in) the output coupling region, $n_c$ represents a refractive index of (an optical waveguide in) the arrayed waveguide region, and $d_i$ represents a periodicity of the arrayed waveguide region on an input coupling region side, $d_o$ represents a periodicity of the arrayed waveguide region on an output coupling region side, $\theta_i$ represents a diffraction angle in the input coupling region, $\theta_o$ represents a diffraction angle in the output coupling region, m represents a diffraction order at which the AWG works, $\lambda$ represents a wavelength of an optical signal, and $\Delta L$ represents a length difference between two adjacent optical waveguides in the arrayed waveguide region.

An angular dispersion equation may be deduced based on the foregoing grating equation, and satisfies Formula 2:

$$\frac{d\theta_0}{d\lambda} = \frac{n_g * m}{n_{so} * d_o * n_c} \qquad \text{Formula 2}$$

where $n_g$ represents a group refractive index, $$n_g = n_c - \lambda_b * \frac{dn_c}{d\lambda}, \text{ and } \lambda_b = \frac{n_c * \Delta L}{m}.$$

Formula 3 may be deduced based on Formula 2:

$$\Delta\theta_0 = \frac{n_g * m * \Delta\lambda}{n_{so} * d_o * n_c} \qquad \text{Formula 3}$$

Because $$\lambda_b * \frac{dn_c}{d\lambda}$$

represents a relatively small quantity, $n_g \approx n_c$. Therefore, Formula 2 may evolve into Formula 4:

$$\frac{d\theta_0}{d\lambda} = \frac{m}{n_{so} * d_o} \quad \text{Formula 4}$$

(2) The term "and/or" describes an association relationship for describing associated objects and represents that three relationships may exist. For example, A and/or B may represent the following three cases: Only A exists, both A and B exist, and only B exists. The character "/" usually indicates an "or" relationship between associated objects.

It should be noted that, "a plurality of" in this application refers to two or more.

In addition, it should be understood that in description of this application, terms such as "first" and "second" are merely used for distinguishing and description, but should not be understood as indicating or implying relative importance, or should not be understood as indicating or implying a sequence.

A waveguide (including a waveguide in an input/output coupling region and a waveguide in an arrayed waveguide region) in a conventional AWG is generally made of a silicon dioxide ($SiO_2$) or silicon (Si) material. Therefore, an optical transmission parameter (a refractive index or the like) of the optical waveguide is fixed, and further a characteristic (for example, a channel spacing) of the AWG is also fixed.

However, in optical communication networks, various gratings with different characteristics are frequently used. For example, a channel spacing of a grating used in an optical communication network with a transmission rate of 100 Gbps is usually 50 GHz, a channel spacing of a grating used in an optical communication network with a transmission rate of 200 Gbps may be 62.5 GHz, a channel spacing of a grating used in an optical communication network with a transmission rate of 400 Gbps may be 75 GHz, and a channel spacing of a grating used in an optical communication network with a transmission rate of 1 Tbps may be 100 GHz.

Because a conventional grating does not support characteristic adjustment, to satisfy such a requirement of gratings with a plurality of characteristics, a grating manufacturer needs to manufacture one type of grating based on each characteristic, leading to relatively high grating manufacturing costs and management and maintenance costs, and also increasing stocking costs of a network deployment party.

The following further illustrates embodiments of this application in detail with reference to drawings of this specification.

An embodiment of this application provides a grating with a variable characteristic. The grating has a characteristic that a refractive index of a waveguide region can be changed or a characteristic that an optical waveguide in an arrayed waveguide region can be eliminated. A structure of the grating is described in detail below in FIG. 2A to FIG. 2J. It should be noted that, a type of the grating is not limited in embodiments of this application. The grating may be an AWG, or may be various types of gratings such as a rotating AWG.

Figure 2A:
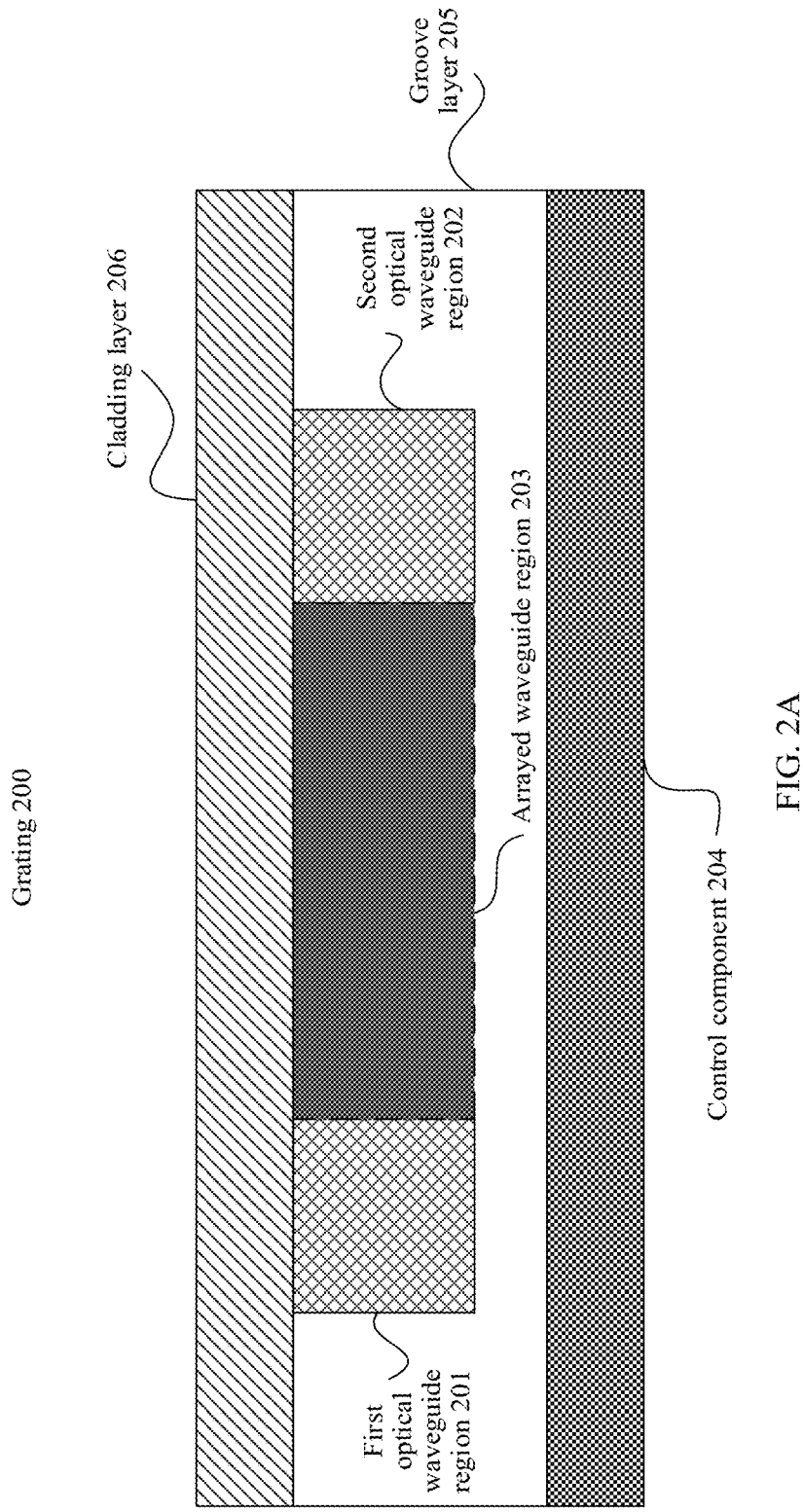
FIG. 2A is a structural diagram of a grating according to an embodiment of this application.

FIG. 2A is a schematic diagram of a longitudinal section of the structure of the grating. The grating 200 includes a plurality of waveguide regions. The following provides a description by using an example in which the grating 200 includes a first optical waveguide region 201, a second optical waveguide region 202, and an arrayed waveguide region 203 including a plurality of optical waveguides. The first optical waveguide region 201 is connected to the arrayed waveguide region 203, and the second optical waveguide region 202 is connected to the arrayed waveguide region 203.

Figure 2B:
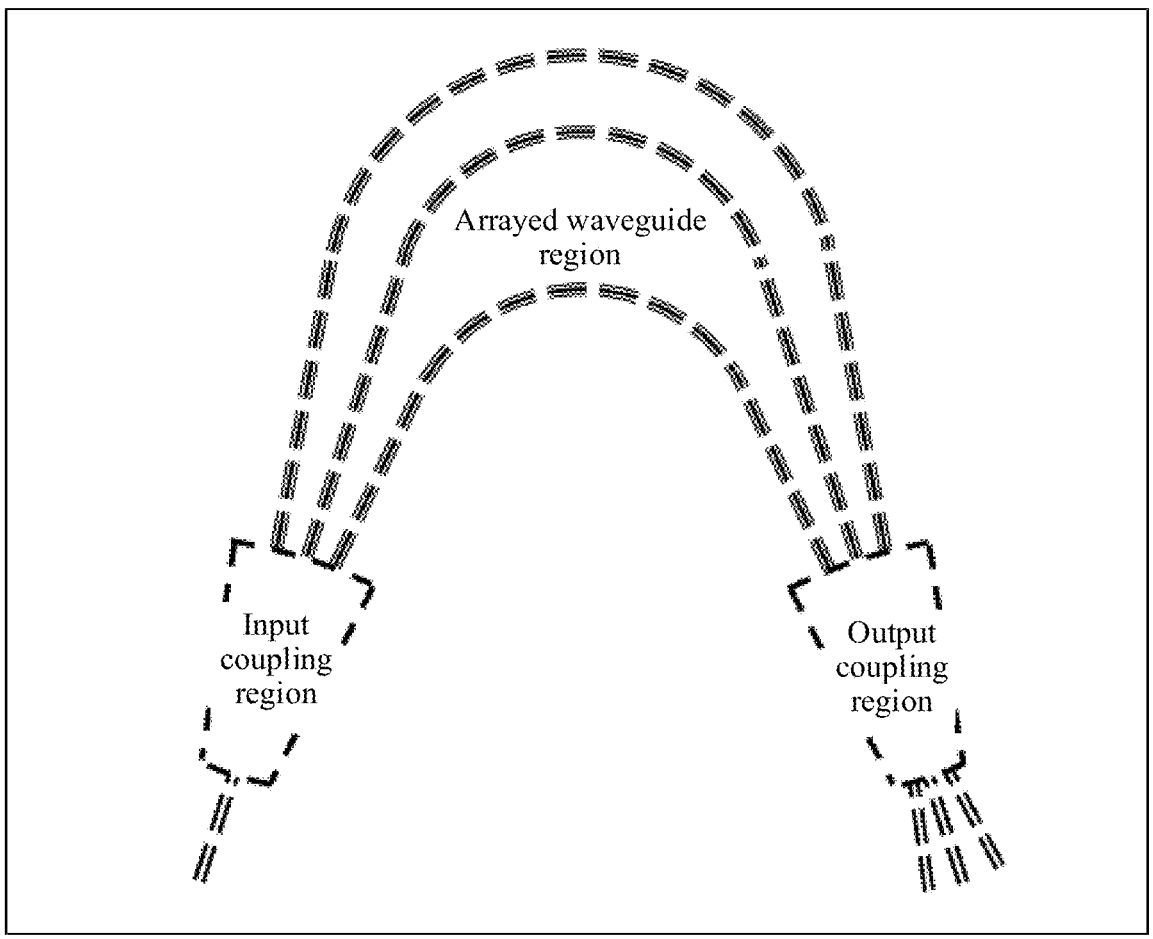
FIG. 2B is a structural diagram of an AWG according to an embodiment of this application.
Figure 2C:
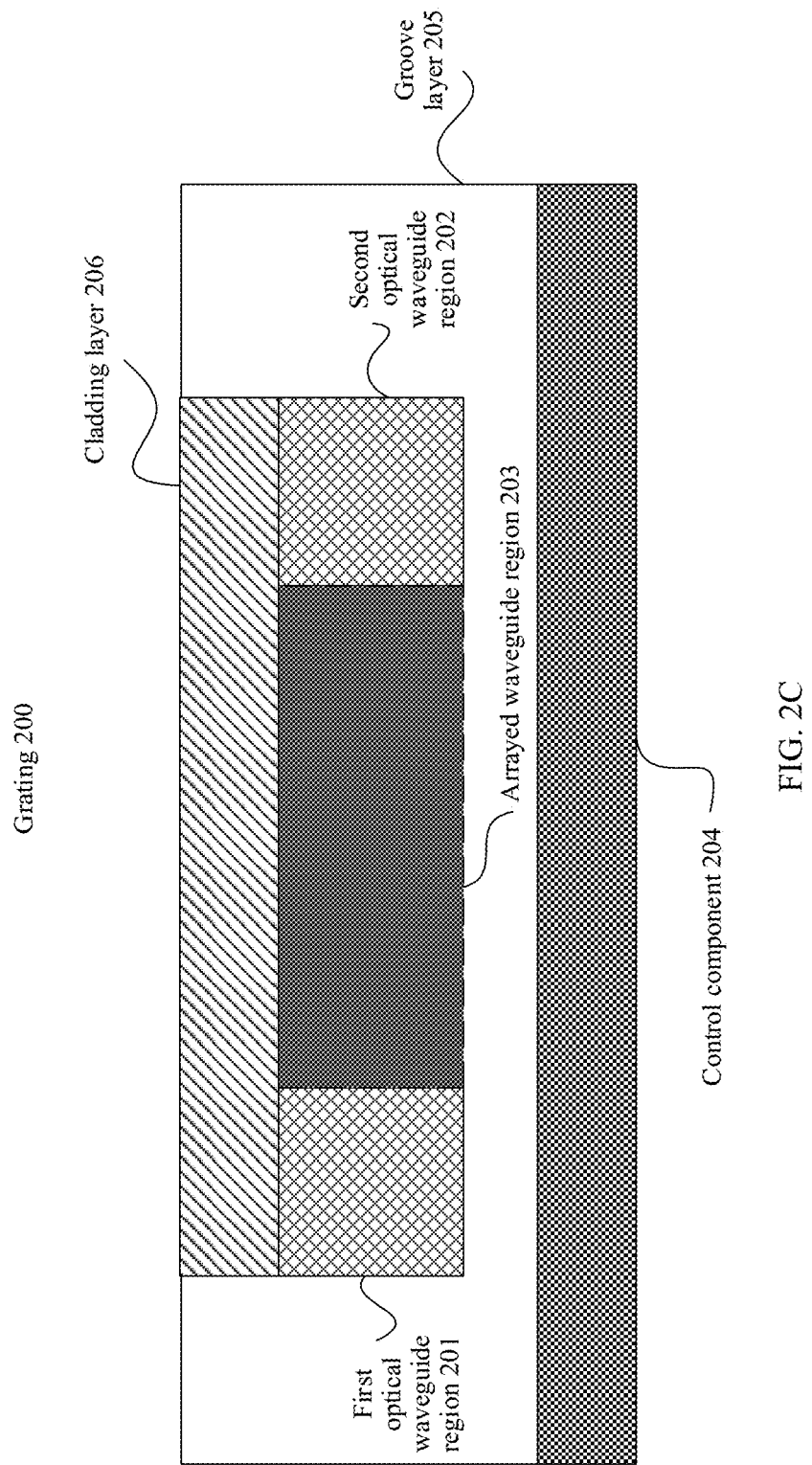
FIG. 2C is a structural diagram of another grating according to an embodiment of this application.
Figure 2D:
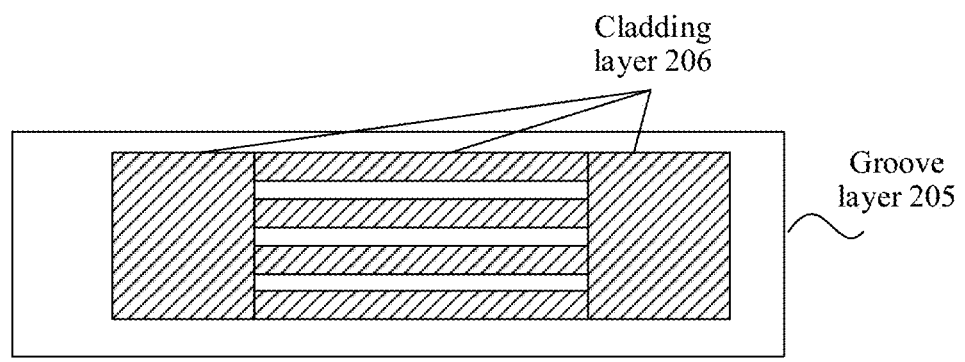
FIG. 2D is a schematic diagram of distribution of cladding layers of a grating according to an embodiment of this application.

For example, when the grating 200 is an arrayed waveguide grating AWG, as shown in FIG. 2B, the grating mainly includes an input coupling region, an arrayed waveguide region, and an output coupling region. To be specific, the first optical waveguide region 201 may be an input coupling region, and the second optical waveguide region 202 may be an output coupling region.

The grating 200 has any one or any combination of the following characteristics:

a refractive index of an optical waveguide in the first optical waveguide region 201 can be changed, a refractive index of an optical waveguide in the second optical waveguide region 202 can be changed, a refractive index of an optical waveguide in the arrayed waveguide region 203 can be changed, and an optical waveguide in the arrayed waveguide region 203 can be eliminated.

The grating 200 is further provided with a control component 204, configured to change a refractive index of an optical waveguide in a target waveguide region in the grating 200 and/or eliminate some optical waveguides in the arrayed waveguide region 203. The target waveguide region is any one or any combination of the first optical waveguide region 201, the second optical waveguide region 202, or the arrayed waveguide region 203.

When the grating 200 implements the any one or any combination of the characteristics, any one or more of a channel spacing, a spectral width of an input diffraction peak, and a spectral width of an output diffraction peak of the grating 200 are changed, thereby implementing a change of a characteristic of the grating 200.

In an implementation, the first optical waveguide region 201 may be any one of an input coupling region, an input free transmission waveguide region, an input slab waveguide region, or an input star coupler region of the grating 200. The second optical waveguide region 202 is any one of an output coupling region, an output free transmission waveguide region, an output slab waveguide region, or an output star coupler of the grating 200. This is not limited in this application.

To ensure that the grating 200 has the foregoing characteristics, in an implementation, an optical waveguide in any one or any combination of the first optical waveguide region 201, the second optical waveguide region 202, or the arrayed waveguide region 203 in the grating 200 is made of an optical material with a variable refractive index. For example, the optical material may be a liquid crystal material, an electro-optic material, a magnetic fluid material, or another material with a variable refractive index. This is not limited in this application.

For example, when an optical waveguide in any waveguide region in the grating 200 is made of a liquid crystal material, the grating 200 further includes a groove layer 205. A groove corresponding to the optical waveguide in the waveguide region is etched at the groove layer 205. The groove layer 205 is configured to form a coating layer of the optical waveguide in the waveguide region. For example, as shown in FIG. 2A, a groove corresponding to an optical waveguide in the first optical waveguide region 201, the second optical waveguide region 202, and the arrayed waveguide region 203 is etched at the groove layer 205. In addition, in a specific processing technique of the grating 200, a manner of capillary encapsulation may be used to add the liquid crystal material to a groove that is at the groove layer 205 and that is corresponding to the optical waveguide.

In addition, corresponding to the groove layer 205, to prevent the optical waveguide located in the groove from being exposed to air, the grating 200 may further include a cladding layer 206. The cladding layer 206 is configured to seal an optical waveguide in any waveguide region (that is, seal a liquid crystal material for manufacturing the optical waveguide). Optionally, the cladding layer 206 may cover the groove layer 205 to seal all grooves at the groove layer 205. Alternatively, the cladding layer 206 may be embedded in a surface layer of the groove layer 205, and is configured to seal each groove at the groove layer 205. For details, refer to a schematic diagram of a longitudinal section of the grating 200 in FIG. 2C and a top view of the grating 200 in FIG. 2D. For example, the cladding layer 206 may be made of an indium tin oxide (indium tin oxide, ITO) glass substrate.

It should be noted that, positions of the cladding layer 206 and the control component 204 are not limited in embodiments of this application. Optionally, the cladding layer 206 and the control component 204 may be respectively located on two sides of the groove layer 205, as shown in FIG. 2A to FIG. 2D. Alternatively, the cladding layer 206 and the control component 204 may be located at the groove layer 205. Alternatively, the control component 204 may be processed at the cladding layer 206. In particular, the control component 204 may alternatively be independent of other units (for example, the first optical waveguide region 201, the second optical waveguide region 202, the arrayed waveguide region 203, the groove layer 205, and the cladding layer 206) in the grating 200. In other words, there is a gap between the control component 204 and each of the other units in the grating. This is not limited in this application.

It should be noted that, because an optical material for manufacturing an optical waveguide is not limited in this application, a manner of changing, by the control component, a refractive index of an optical waveguide made of an optical material is not limited in this application either. In this embodiment of this application, a management device for managing the grating 200 (referred to as a grating management device below for short) may use, without limitation to, any one or any combination of the following manners to change the refractive index of the optical waveguide.

Manner 1: The grating management device may change a voltage or an electric field of an optical waveguide in any waveguide region in the grating 200 to change a refractive index of the optical waveguide.

Manner 2: The grating management device may change a magnetic field of an optical waveguide in any waveguide region in the grating 200 to change a refractive index of the optical waveguide.

Manner 3: The grating management device may change a temperature of an optical waveguide in any waveguide region in the grating 200 to change a refractive index of the optical waveguide.

A specific structure of the grating 200 varies depending on a manner of changing a refractive index of an optical waveguide.

Figure 2E:
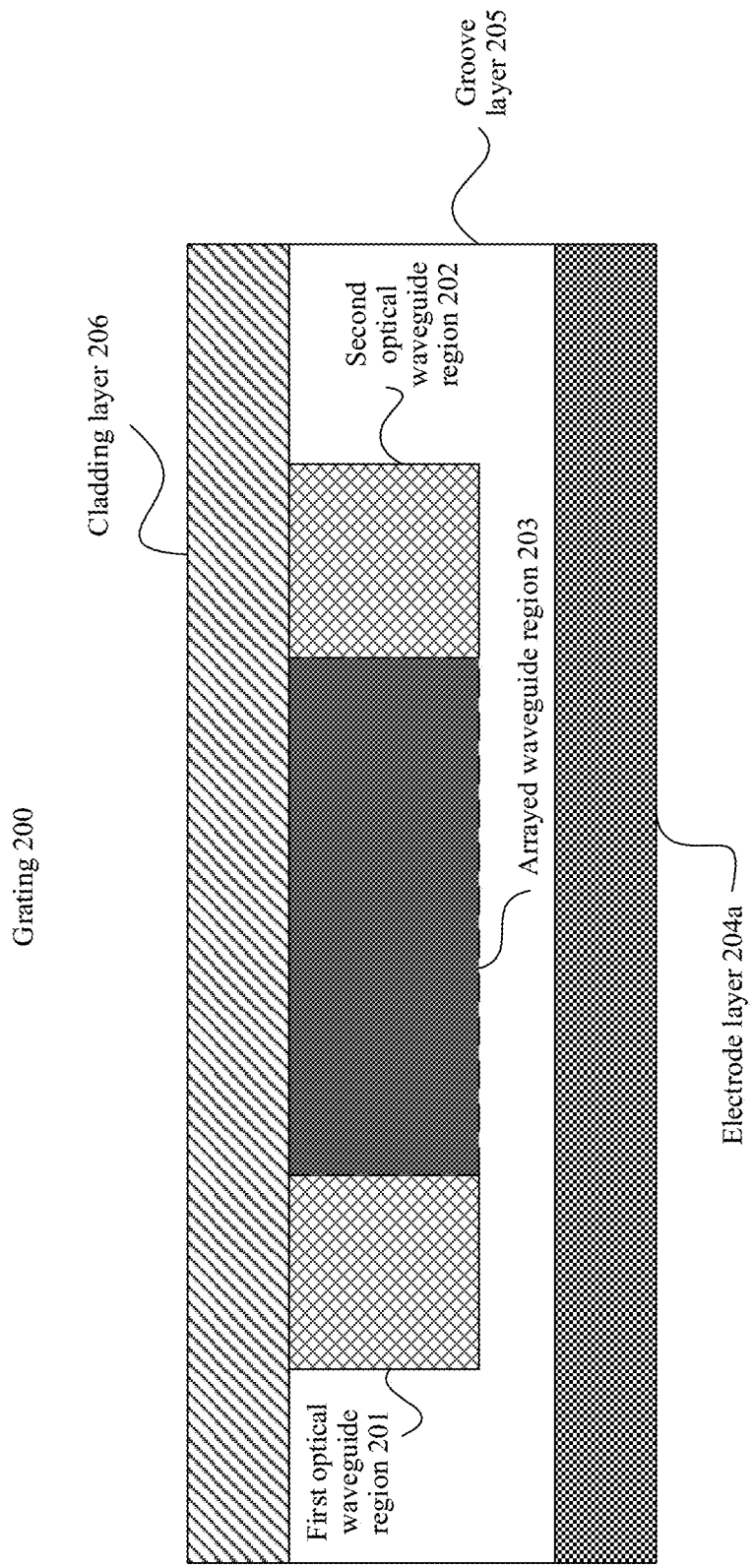
FIG. 2E is a structural diagram of still another grating according to an embodiment of this application.

In an implementation, when the refractive index of the optical waveguide in the any waveguide region in the grating 200 is changed in the foregoing Manner 1, the control component 204 is an electrode layer 204a. The electrode layer 204a is configured to provide different voltages or electric fields to the grating 200 to cause the following change of the grating 200: a change of a refractive index of an optical waveguide in the target waveguide region. In this implementation, the structure of the grating 200 is shown in FIG. 2E.

It should be noted that, when the cladding layer 206 and the electrode layer 204a are located on two sides of the groove layer 205, the cladding layer may be further used as a ground layer of an electrode at the electrode layer 204a, and provide a voltage or an electric field to the grating 200 together with the electrode layer 204a. In addition, an electrode may be processed at the cladding layer 206, so that the cladding layer 206 may also be used as the electrode layer 204a.

In addition, to flexibly control a refractive index of an optical waveguide in any one or more waveguide regions in the grating, optionally, the electrode layer 204a includes any one or any combination of the following:

an electrode region corresponding to the optical waveguide in the first optical waveguide region, an electrode region corresponding to the optical waveguide in the second optical waveguide region, an electrode region corresponding to each optical waveguide in the arrayed waveguide region, or an electrode region corresponding to some or all optical waveguides in the arrayed waveguide region.

Figure 2F:
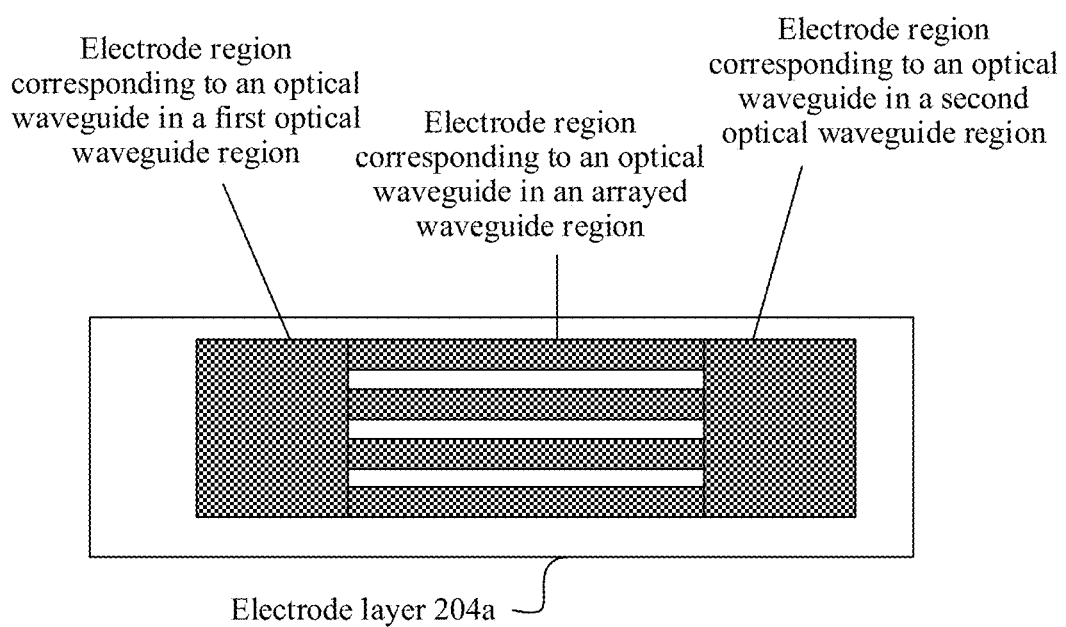
FIG. 2F is a schematic diagram of distribution of electrode regions at an electrode layer according to an embodiment of this application.

For distribution of electrode regions of optical waveguides at the electrode layer 204a, refer to FIG. 2F.

In this way, when refractive indexes of optical waveguides in different optical waveguide regions need to be set to different values, the grating management device may supply, based on different voltages, power to electrode regions corresponding to the optical waveguides in the different waveguide regions.

In another implementation, when the refractive index of the optical waveguide in the any waveguide region in the grating 200 is changed in the foregoing Manner 2, the control component 204 is a magnetic pole layer 204b. Because a magnetic field includes two magnetic poles: a south pole and a north pole, the magnetic pole layer 204b is divided into a first magnetic pole layer 204b1 and a second magnetic pole layer 204b2. In addition, the first magnetic pole layer 204b1 and the second magnetic pole layer 204b2 are located on two sides of the groove layer 205, and magnetic poles of the two magnetic pole layers are different.

Figure 2G:
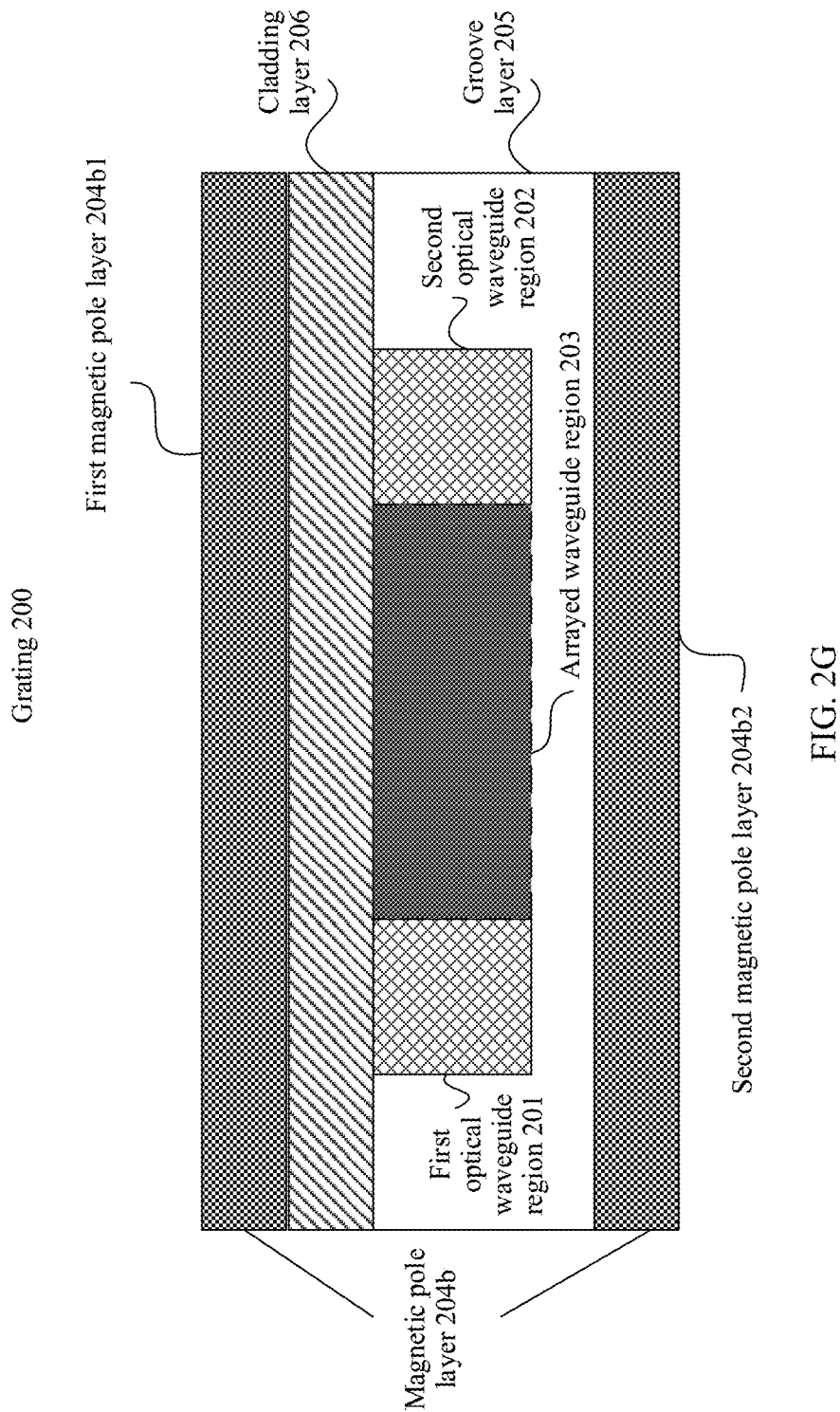
FIG. 2G is a structural diagram of still another grating according to an embodiment of this application.

The magnetic pole layer 204b is configured to provide different magnetic fields to the grating 200 to cause the following change of the grating 200: a change of a refractive index of an optical waveguide in the target waveguide region. In this implementation, the structure of the grating 200 is shown in FIG. 2G.

It should be noted that, positions of the cladding layer 206 and the first magnetic pole layer 204b1 are not limited in this application. Optionally, the first magnetic pole layer 204b1 may be located between the cladding layer 206 and the groove layer 205, or may be located on the cladding layer 206, as shown in FIG. 2G. Alternatively, the first magnetic pole layer 204b1 may be used as the cladding layer 206, and is configured to seal an optical waveguide in any waveguide region. Alternatively, a unit having a gap with each of the other units (for example, the first optical waveguide region 201, the second optical waveguide region 202, the arrayed waveguide region 203, the groove layer 205, and the cladding layer 206) in the grating 200 provides a magnetic field to the grating 200.

In addition, to flexibly control a refractive index of an optical waveguide in any waveguide region in the grating, optionally, the magnetic pole layer 204b includes any one or any combination of the following:

a magnetic pole region corresponding to the optical waveguide in the first optical waveguide region, a magnetic pole region corresponding to the optical waveguide in the second optical waveguide region, a magnetic pole region corresponding to each optical waveguide in the arrayed waveguide region, or a magnetic pole region corresponding to some or all optical waveguides in the arrayed waveguide region.

Figure 2H:
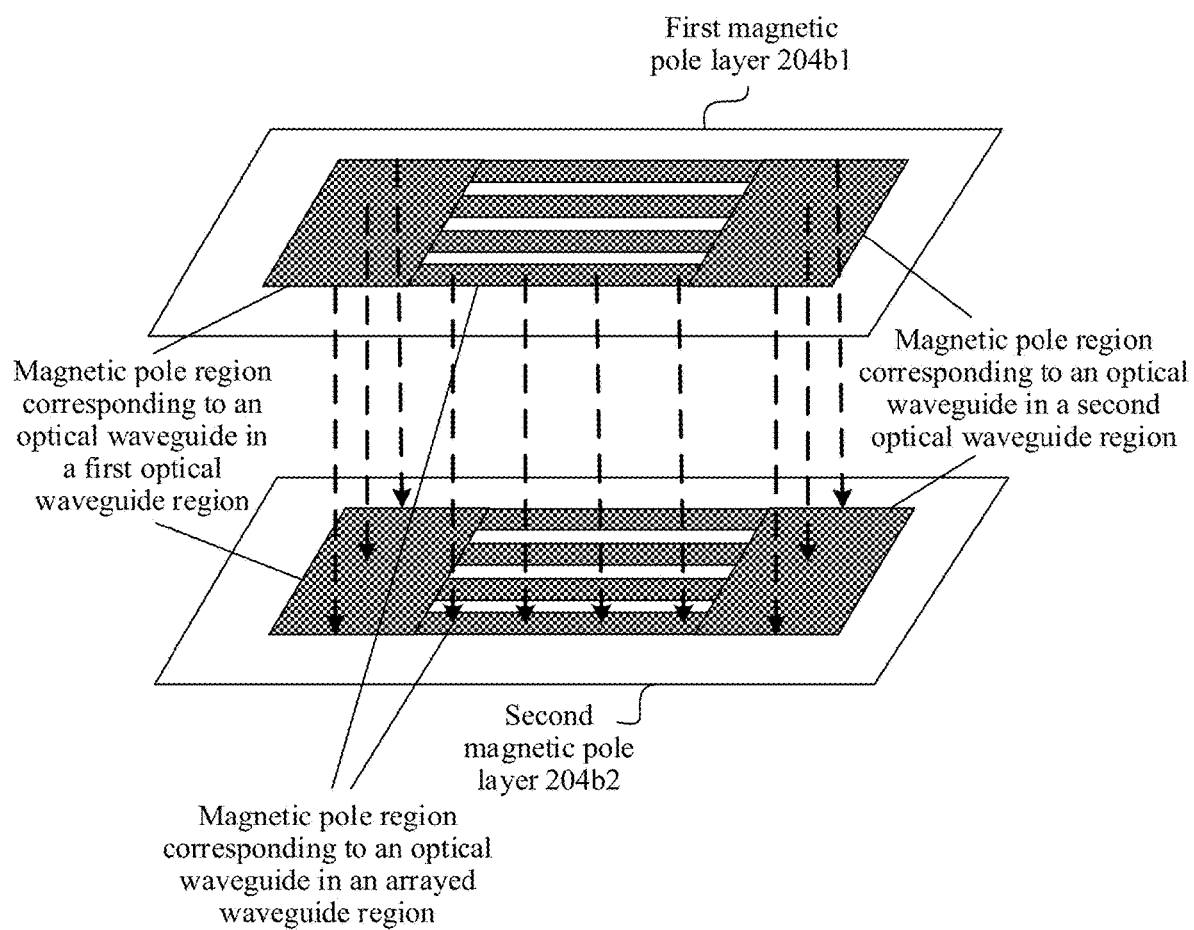
FIG. 2H is a schematic diagram of distribution of magnetic pole regions at a magnetic pole layer according to an embodiment of this application.

For distribution of magnetic pole regions of optical waveguides at the magnetic pole layer 204b, refer to FIG. 2H.

In this way, when refractive indexes of optical waveguides in different optical waveguide regions need to be set to different values, the grating management device may adjust, based on different magnetic field strengths, magnetic fields of magnetic pole regions corresponding to the optical waveguides in the different waveguide regions. For example, a magnetic pole region corresponding to each optical waveguide region includes a first magnetic pole region located at the first magnetic pole layer 204b1 and a second magnetic pole region located at the second magnetic pole layer 204b2. A coil is wound in at least one of the first magnetic pole region and the second magnetic pole region, so that the grating management device changes a current strength of a coil of any magnetic pole region to change a magnetic field strength of the magnetic pole region.

In still another implementation, when the refractive index of the optical waveguide in the any waveguide region in the grating 200 is changed in the foregoing Manner 3, the control component 204 includes a temperature control layer 204c. The temperature control layer 204c needs to have at least a function of controlling a temperature of the grating 200.

The temperature control layer 204c has functions of increasing and decreasing a temperature and can be in a constant temperature state, and is configured to adjust a temperature of the temperature control layer 204c to a target temperature. In this way, a temperature of the grating 200 is affected through heat transfer, to adjust the temperature of the grating 200 to the target temperature. For example, a main component of the temperature control layer 204c may be made of a material capable of increasing and decreasing a temperature, for example, a graphene material or a thermoelectric alloy material.

Figure 2I:
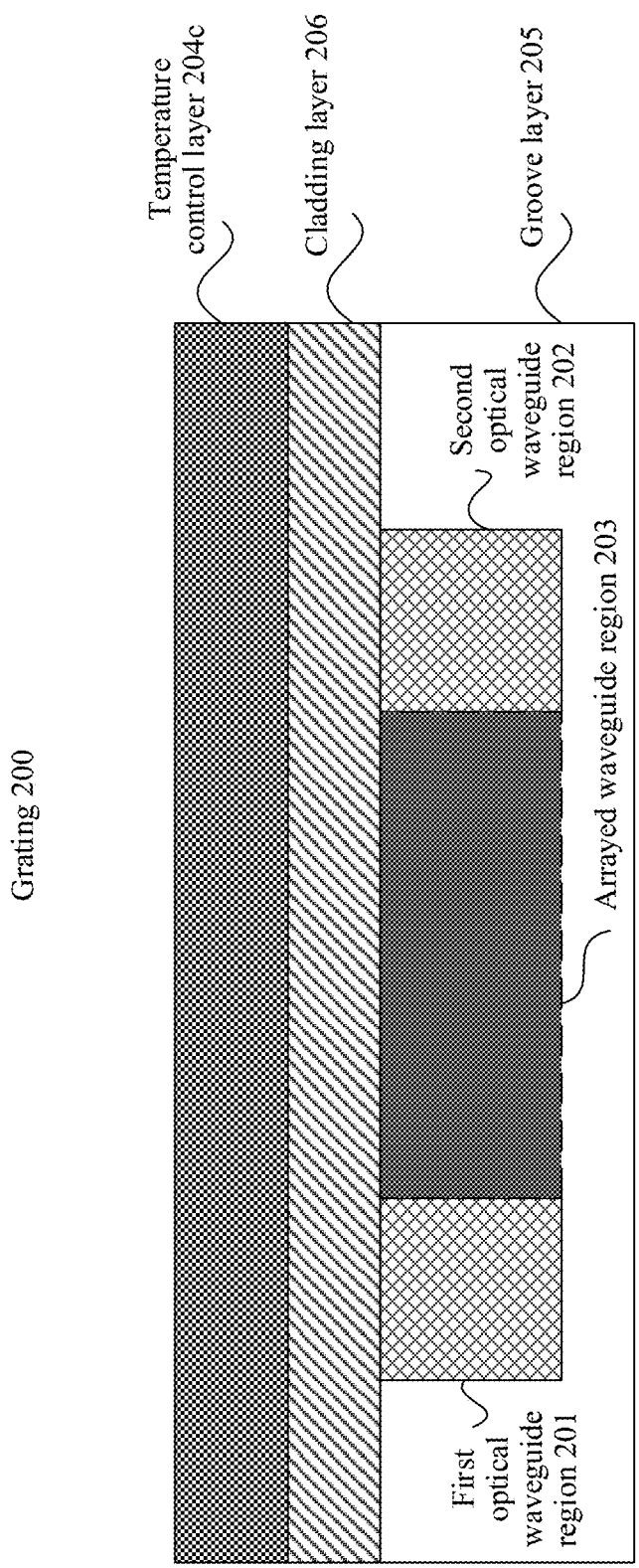
FIG. 2I is a structural diagram of still another grating according to an embodiment of this application.

The temperature control layer 204c is configured to provide different temperatures to the grating 200 to cause the following change of the grating 200: a change of a refractive index of an optical waveguide in the target waveguide region. In this implementation, the structure of the grating 200 is shown in FIG. 2I.

It should be noted that, a position of the temperature control layer 204c is not limited in this application. Optionally, the temperature control layer 204c may be located between the cladding layer 206 and the groove layer 205, or may be located on the cladding layer 206, as shown in FIG. 2I. The temperature control layer 204c may be further used as the cladding layer 206, and is configured to seal an optical waveguide in any waveguide region.

In addition, to flexibly control a refractive index of an optical waveguide in any waveguide region in the grating, optionally, the temperature control layer 204c includes any one or any combination of the following:

a temperature control region corresponding to the optical waveguide in the first optical waveguide region, a temperature control region corresponding to an optical waveguide in the second optical waveguide region, a temperature control region corresponding to each optical waveguide in the arrayed waveguide region, or a temperature control region corresponding to some or all optical waveguides in the arrayed waveguide region.

In this way, when refractive indexes of optical waveguides in different optical waveguide regions need to be set to different values, the grating management device may adjust, based on different temperatures, temperatures of temperature control regions corresponding to the optical waveguides in the different waveguide regions.

A person skilled in the art understands that, a condition for transmitting an optical signal by an optical waveguide is that the optical waveguide can implement total reflection, and a necessary condition for total reflection is that a refractive index of the optical waveguide is higher than that of a coating layer of the optical waveguide. Therefore, the grating management device can change a refractive index of an optical waveguide in the arrayed waveguide region 203 to eliminate the optical waveguide in the arrayed waveguide region 203 or keep the optical waveguide effective. For a method for adjusting the refractive index of the optical waveguide by the grating management device, refer to the foregoing specific description of the method for changing a refractive index of an optical waveguide by the grating management device. Details are not described herein again.

In conclusion, this embodiment of this application provides the grating with a variable characteristic. The grating has the following characteristic: a refractive index of an optical waveguide in at least one waveguide region can be changed and/or an optical waveguide in an arrayed waveguide region can be eliminated. Therefore, the grating management device can change the refractive index of the optical waveguide in the target waveguide region and/or eliminate some optical waveguides in the arrayed waveguide region by using the control component in the grating. In this way, at least one of the channel spacing, the spectral width of the input diffraction peak, and the spectral width of the output diffraction peak of the grating is changed, thereby finally changing the characteristic of the grating. Further, manufacturing costs and maintenance costs of the grating can be reduced during production and using of the grating.

Figure 2J:
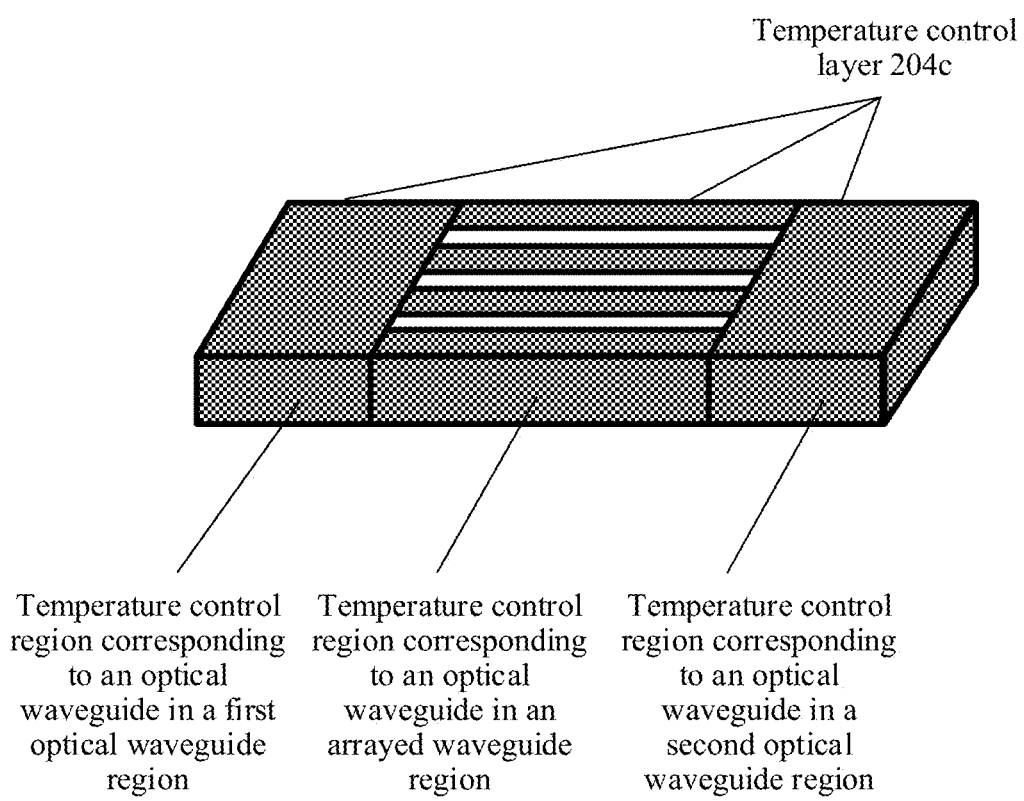
FIG. 2J is a schematic diagram of distribution of temperature control regions at a temperature control layer according to an embodiment of this application.
Figure 3:
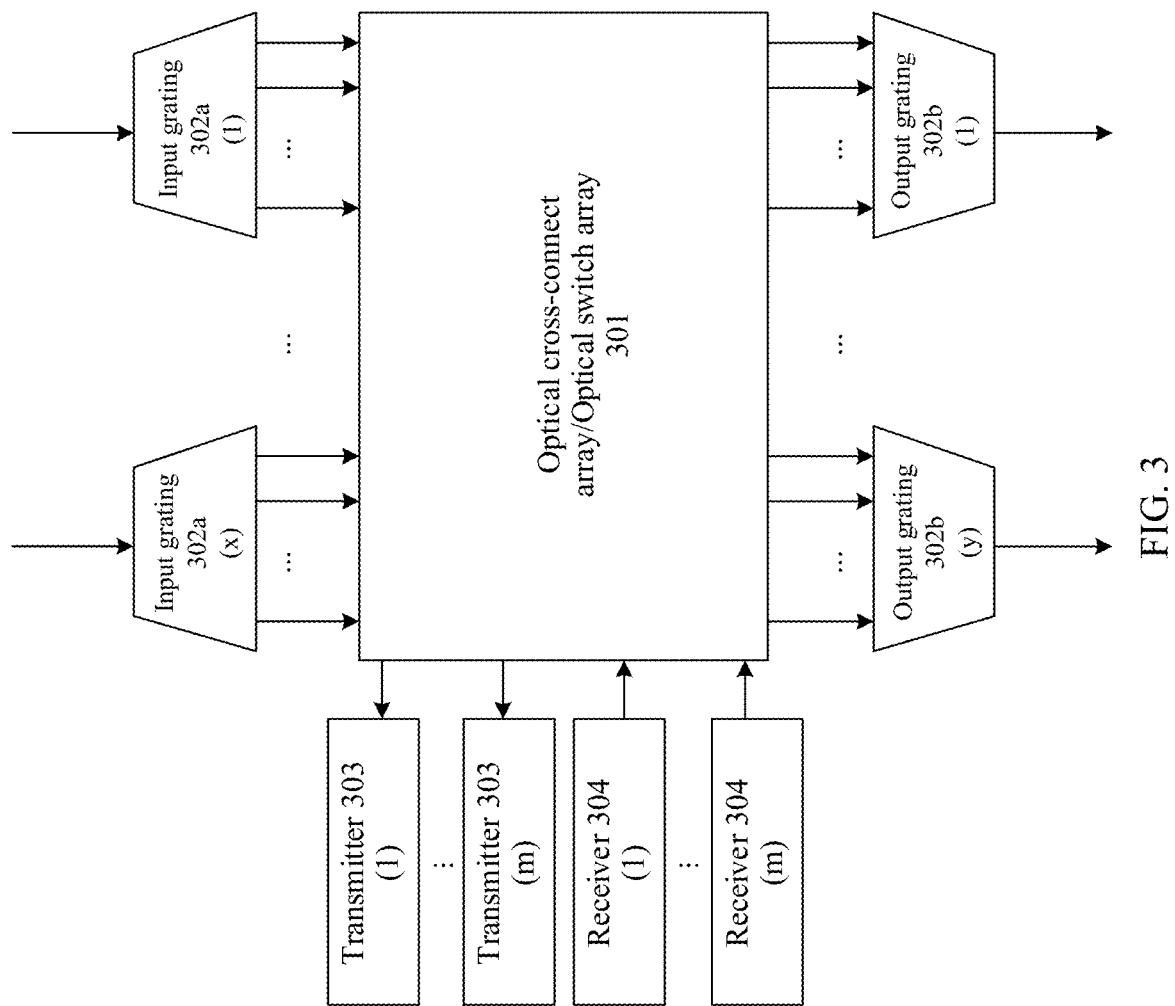
FIG. 3 is a structural diagram of an optical add/drop multiplexer according to an embodiment of this application.

Based on the grating provided in the foregoing embodiment, an embodiment of this application further provides an optical add/drop multiplexer with a variable characteristic, for example, a (reconfigurable) optical add/drop multiplexer ((reconfigurable) optical add/drop multiplexer, (R) OADM). As shown in FIG. 3, the optical add/drop multiplexer 300 includes an optical cross-connect array or optical switch array 301 and at least one grating 302 with a variable characteristic (for a specific structure thereof, refer to the description of the foregoing embodiment and refer to FIG. 2A to FIG. 2J), and the at least one grating 302 is connected to the optical cross-connect array or optical switch array 301. As shown in the figure, the at least one grating 302 may include at least one input grating 302a, include at least one output grating 302b, or include at least one input grating 302a and at least one output grating 302b. In an implementation, the optical add/drop multiplexer further includes at least one transmitter 303 and/or at least one receiver 304.

Based on the grating provided in the foregoing embodiment, feasibility of adjusting a characteristic of the grating is analyzed below by using an AWG with a wavelength demultiplexing function as an example. The AWG can implement a variable channel spacing (channel spacing). For example, the channel spacing of the AWG is switched between 50 GHz, 62.5 GHz, 75 GHz, and 100 GHz.

A person skilled in the art understands that, a change of a channel spacing of an input/output optical signal of the AWG may be approximated as a change of a wavelength interval $\Delta\lambda$. For example, the channel spacing of 50 GHz corresponds to a wavelength interval of 0.4 nm, the channel spacing of 62.5 GHz corresponds to a wavelength interval of 0.5 nm, the channel spacing of 75 GHz corresponds to a wavelength interval of 0.6 nm, and the channel spacing of 100 GHz corresponds to a wavelength interval of 0.8 nm.

Feasibility of changing a channel spacing of the AWG is analyzed below based on whether a basic structure of the AWG can be changed.

First case: When the channel spacing of the AWG is changed, the basic structure of the AWG remains unchanged.

The basic structure of the AWG remains unchanged. To be specific, $d_o$ and $\Delta\theta_o$ cannot be changed. Therefore, to implement the change of the channel spacing of the AWG, a refractive index of at least one waveguide region in the AWG may be changed.

a. In Formula 2, $n_g$ represents a group refractive index, $$n_g = n_c - \lambda_b * \frac{dn_c}{d\lambda}.$$

In addition, because a value of $$\frac{dn_c}{d\lambda}$$

is relatively small (a value of $$\frac{dn_c}{d\lambda}$$

of an $SiO_2$ waveguide is generally 0.0048), $n_g \approx n_c$, and Formula 2 may evolve into Formula 4:

$$\frac{d\theta_0}{d\lambda} = \frac{m}{n_{so} * d_o}.$$

In addition, because $d_o$ and $\Delta\theta_o$ cannot be changed when the channel spacing of the AWG is changed, Formula 5 may be obtained based on Formula 4. In other words, Formula 5 needs to be satisfied for all channel spacings:

$$\frac{m_1 * \Delta\lambda_1}{n_{xo1}} = \frac{m_2 * \Delta\lambda_2}{n_{so2}} = \frac{m_3 * \Delta\lambda_3}{n_{so3}} = \ldots \frac{m_1 * \Delta\lambda_j}{n_{soj}} \quad \text{Formula 5}$$

where subscripts 1, 2, 3, . . . , and j in Formula 5 represent different channel spacings.

$\Delta\lambda$ is known when the channel spacing is changed. Therefore, a grating management device may change either or a combination of m and $n_{so}$ based on a specific case, to satisfy Formula 5.

It should be noted that, if only $n_{so}$ is changed, a change range of $n_{so}$ is relatively large. For example, when $\Delta\lambda$ is changed from 0.4 nm (corresponding to the channel spacing of 50 GHz) to 0.8 nm (corresponding to the channel spacing of 100 GHz), to keep other parameters unchanged, $n_{so}$ needs to be doubled. However, currently, there is almost no material that can double a refractive index.

b. It can be learned according to Formula 5 that, when the channel spacing of the AWG needs to be changed, the grating management device may change either or a combination of m and $n_{so}$. AWGs made of different materials are described below by using examples.

Example 1: AWG made of an E7 liquid crystal material (an extraordinary light refractive index is $n_e$=1.741, and an ordinary light refractive index is $n_o$=1.517).

When the AWG works at the channel spacing of 50 GHz (channel spacing 1), $\Delta\lambda_1$=0.4 nm, $m_1$=6*k, and $n_{so1}$=1.517.

When the AWG works at the channel spacing of 62.5 GHz (channel spacing 2), $\Delta\lambda_2$=0.5 nm, $m_2$=5*k, and $n_{so2}$=1.580.

When the AWG works at the channel spacing of 75 GHz (channel spacing 3), $\Delta\lambda_3$=0.6 nm, $m_3$=4*k, and $n_{so3}$=1.517.

When the AWG works at the channel spacing of 100 GHz (channel spacing 4), $\Delta\lambda_4$=0.8 nm, $m_4$=3*k, and $n_{so4}$=1.517, where k is a positive integer.

Example 2: AWG made of a liquid crystal material with a high refractive index ($n_e$=1.867, and an ordinary light refractive index is $n_o$=1.514).

When the AWG works at the channel spacing of 50 GHz (channel spacing 1), $\Delta\lambda_1$=0.4 nm, $m_1$=4*k, and $n_{so1}$=1.660.

When the AWG works at the channel spacing of 62.5 GHz (channel spacing 2), $\Delta\lambda_2$=0.5 nm, $m_2$=3*k, and $n_{so2}$=1.556.

When the AWG works at the channel spacing of 75 GHz (channel spacing 3), $\Delta\lambda_3$=0.6 nm, $m_3$=3*k, and $n_{so3}$=1.867.

When the AWG works at the channel spacing of 100 GHz (channel spacing 4), $\Delta\lambda_4$=0.8 nm, $m_4$=2*k, and $n_{so4}$=1.660.

It can be learned from the foregoing examples that, in some cases, only a diffraction order m of the AWG may be changed when the channel spacing of the AWG is adjusted from the channel spacing 1 to the channel spacing 2, for example, when the AWG switches between any two of the channel spacing 1, the channel spacing 3, and the channel spacing 4 in Example 1, or when the AWG switches between the channel spacing 1 and the channel spacing 4 in Example 2.

In some cases, only a refractive index $n_{so}$ of an output coupling region may be changed when the channel spacing of the AWG is adjusted from the channel spacing 1 to the channel spacing 2, for example, when the AWG switches between the channel spacing 2 and the channel spacing 3 in Example 2.

In other cases, both m and $n_{so}$ may be changed when the channel spacing of the AWG is adjusted from the channel spacing 1 to the channel spacing 2, for example, when the AWG switches between the channel spacing 2 and any other channel spacing in Example 1, or when the AWG switches between the channel spacing 2 or the channel spacing 3 and any other channel spacing in Example 2.

c. After the channel spacing of the AWG is changed, a grating equation, that is, Formula 1, still needs to be satisfied, and the basic structure of the AWG cannot be changed.

(1) Using a wavelength demultiplexer as an example, when channel spacings are different, assuming that center frequencies corresponding to one wavelength are the same and Formula 1 is satisfied, based on the foregoing analysis, $\Delta\theta_o$ of the grating is not changed when a channel spacing is changed. In this way, different channel spacings can be implemented by using one AWG. It is assumed that this wavelength is $\lambda_u$.

(2) For different channel spacings, the parameters $d_i$, $\sin\theta_i$, $\Delta L$, $d_o$, and $\sin\theta_o$ in the grating equation should remain unchanged. Therefore, for different channel spacings, Equation set 1 may be obtained:

$$\begin{cases} n_{si1}*d_i*\sin\theta_i + n_{c1}*\Delta L + n_{so1}*d_o*\sin\theta_o = m_1*\lambda_u \\ n_{si2}*d_i*\sin\theta_i + n_{c2}*\Delta L + n_{so2}*d_o*\sin\theta_o = m_2*\lambda_u \\ n_{si1}*d_i*\sin\theta_i + n_{c3}*\Delta L + n_{so3}*d_o*\sin\theta_o = m_3*\lambda_u \\ n_{si4}*d_i*\sin\theta_i + n_{c4}*\Delta L + n_{so4}*d_o*\sin\theta_o = m_4*\lambda_u \end{cases} \quad \text{Equation set 1}$$

(3) Using the AWG made of the E7 liquid crystal material as an example, m and $n_{so}$ of the AWG in Example 1 that are corresponding to different channel spacings are substituted into Equation set 1, to obtain Equation set 2:

$$\begin{cases} n_{si1}*d_i*\sin\theta_i + n_{c1}*\Delta L + 1.517*d_o*\sin\theta_o = 6 + k*\lambda_u \\ n_{si2}*d_i*\sin\theta_i + n_{c2}*\Delta L + 1.580*d_o*\sin\theta_o = 5*k*\lambda_u \\ n_{si1}*d_i*\sin\theta_i + n_{c3}*\Delta L + 1.517*d_o*\sin\theta_o = 4*k*\lambda_u \\ n_{si4}*d_i*\sin\theta_i + n_{c4}*\Delta L + 1.517*d_o*\sin\theta_o = 3*k*\lambda_u \end{cases} \quad \text{Equation set 2}$$

(4) There are a plurality of groups of solutions for Equation set 2. For example, one group of solutions is $\Delta L=15$ um, $d_i=d_o=32.8$ um, and $\theta_i=10°$. In addition, when the channel spacing of the AWG made of the E7 liquid crystal material is changed, $\lambda=1529.163$ nm is used as a reference and a signal corresponding to $\lambda=1529.163$ nm is constantly output at $\theta_o=10°$.

In conclusion, values of parameters of the AWG that are corresponding to different channel spacings may be summarized as follows:

When the AWG works at the channel spacing of 50 GHz (channel spacing 1), $\Delta\lambda_1=0.4$ nm, $m_1=6*k$, $n_{so1}1.517$, $n_{si1}=1.517$, and $n_{c1}=1.741$.

When the AWG works at the channel spacing of 62.5 GHz (channel spacing 2), $\Delta\lambda_2=0.5$ nm, $m_2=5*k$, $n_{so2}=1.580$, $n_{si2}=1.517$, and $n_{c2}=1.662$.

When the AWG works at the channel spacing of 75 GHz (channel spacing 3), $\Delta\lambda_3=0.6$ nm, $m_3=4*k$, $n_{so3}=1.517$, $n_{si3}=1.741$, and $n_{c3}=1.620$.

When the AWG works at the channel spacing of 100 GHz (channel spacing 4), $\Delta\lambda_4=0.8$ nm, $m_4=3*k$, $n_{so4}=1.517$, $n_{si4}=1.741$, and $n_{c4}=1.517$.

(5) Based on the values of the parameters in (4) that are of the AWG made of the E7 liquid crystal material and that are corresponding to different channel spacings, it can be learned that, in some cases, to satisfy the grating equation, at least one of a refractive index $n_{si}$ of an input coupling region, a refractive index $n_{so}$ of an output coupling region, and a refractive index $n_c$ of an arrayed waveguide region may not be changed.

It should be noted that, the foregoing description is merely an example for description, and cannot limit values of parameters that are of AWGs made of different materials and that are corresponding to different channel spacings, or limit values of parameters that are of an AWG made of the E7 material and that are corresponding to different channel spacings.

Second case: When the channel spacing of the AWG is changed, some structure parameters of the AWG may also be changed.

For example, an optical waveguide in the grating is made of a material with a variable refractive index. If a refractive index of an optical waveguide in an arrayed waveguide region is controlled to be the same as or less than a refractive index of a material of a coating layer, the optical waveguide disappears. Therefore, to implement the change of the channel spacing of the AWG, some optical waveguides may be selectively eliminated, thereby changing a periodicity d of the arrayed waveguide region and a length difference $\Delta L$ between two adjacent optical waveguides in the arrayed waveguide region.

Figure 4:
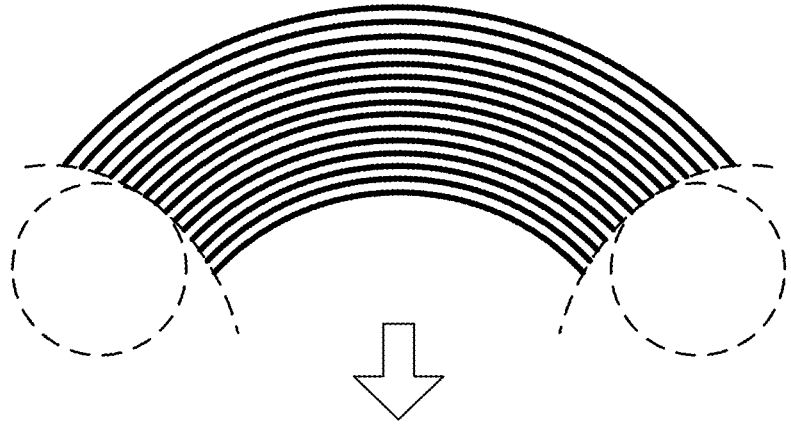
FIG. 4 is a diagram of an example in which a structure of an arrayed waveguide region is changed according to an embodiment of this application.
Figure 4:
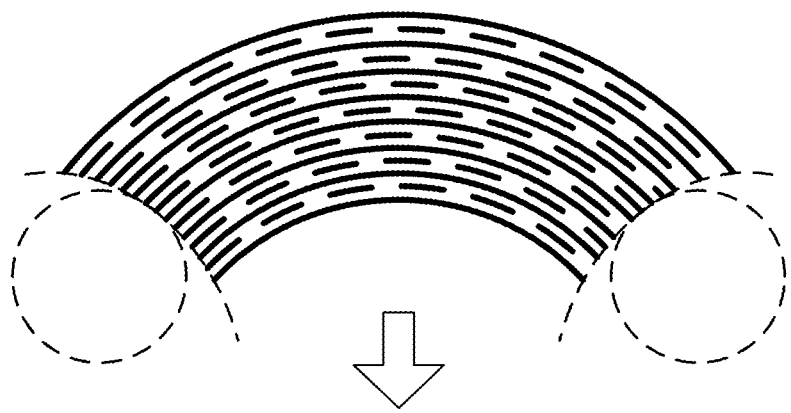
Figure 4:
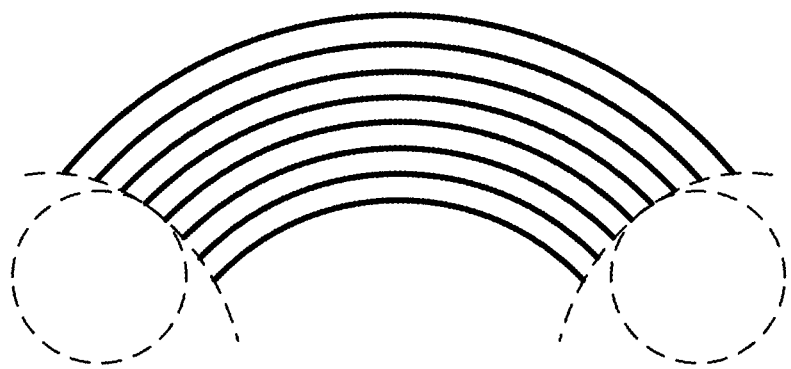

For example, as shown in FIG. 4, one optical waveguide, for example, an optical waveguide that is indicated by a dashed line in FIG. 4 and that needs to be eliminated, is eliminated from an arrayed waveguide region of a grating at an interval of one optical waveguide. In this case, each of a periodicity d of an adjusted arrayed waveguide region and a length difference $\Delta L$ between two adjacent optical waveguides in the adjusted arrayed waveguide region may be doubled.

(1) The following provides a description by using a case in which the channel spacing of the AWG is adjusted from 50 GHz (corresponding to a wavelength interval $\Delta\lambda_1=0.4$ nm) to 100 GHz (corresponding to a wavelength interval $\Delta\lambda_4=0.8$ nm) as an example. The grating management device needs to control a refractive index of an optical waveguide in the arrayed waveguide region to satisfy $d_{o4}=d_{o1}$ and keep the other parameters unchanged, that is, $m_4=m_1$ and $n_{so4}=n_{so1}$. In this way, an angular dispersion equation of the AWG can be satisfied.

(2) In addition, the following Equation set 3 may be obtained based on the grating equation of the AWG.

$$\begin{cases} n_{si1}*d*\sin\theta_i + n_{c1}*\Delta L_1 + n_{so1}*d*\sin\theta_o = m_1*\lambda_u \\ n_{si4}*2d*\sin\theta_i + n_{c4}*2\Delta L_1 + n_{so1}*2d*\sin\theta_o = m_1*\lambda_u \end{cases} \quad \text{Equation set 3}$$

(3) Main parameters of the AWG are $d=33.5$ um and $\theta_i=-10°$. In addition, when the channel spacing of the AWG made of the E7 liquid crystal material is changed, $\lambda=1529.163$ nm is used as a reference and a signal corresponding to $\lambda=1529.163$ nm is constantly output at $\theta_o=-10°$.

In conclusion, values of parameters of the AWG that are corresponding to different channel spacings may be summarized as follows:

When the AWG works at the channel spacing of 50 GHz (channel spacing 1), $\Delta\lambda_1=0.4$ nm, $m_1=6*k$, $n_{so1}=1.741$, $n_{si1}=1.539$, $n_{c1}=1.741$, $d_{i1}=d_{o1}=33.5$ um, and $\Delta L_1=16$ um. When the AWG works at the channel spacing of 100 GHz (channel spacing 4), $\Delta\lambda_4=0.8$ nm, $m_4=6*k$, $n_{so4}=1.741$, $n_{si4}=1.715$, $n_{c4}=1.517$, $d_{i1}=d_{o1}=67$ um, and $\Delta L_4=32$ um.

(4) In the foregoing examples, the values of d are relatively large, and the values of m are relatively small. In an actual design, other parameters (an insertion loss, channel crosstalk, a channel filtering spectral shape, and the like) of the AWG are affected. Therefore, comprehensive adjustment may be performed based on adjustment of the change of the structure parameters of the AWG in combination with the refractive index $n_{so}$ of the output coupling region, the diffraction order m, the refractive index $n_{si}$ of the input coupling region, and the refractive index $n_c$ of the arrayed waveguide region, to obtain better AWG parameters when the channel spacing of the AWG is changed. For example, in a relatively dense preset arrayed waveguide, when $\Delta\lambda_1=0.4$ nm, one optical waveguide is chosen to be eliminated from the arrayed waveguide region at an interval of one effective optical waveguide; and when $\Delta\lambda_4=0.8$ nm, one optical waveguide is chosen to be eliminated at an interval of two effective optical waveguides. In this case, $d_4=1.5d_1$, or $d_4$ is another non-integer multiple of $d_1$, and then other parameters are adjusted, so that better AWG parameters can be obtained.

Based on the foregoing analysis of the two cases, it can be learned that, to implement the change of the channel spacing of the AWG, an essential method used is to adjust any one or any combination of the refractive index of the output coupling region, the refractive index of the input coupling region, the refractive index of the arrayed waveguide region, and the structure parameters of the arrayed waveguide region (and a length difference between two connected optical waveguides in the arrayed waveguide region and/or a periodicity of the arrayed waveguide region).

Parameters that need to be adjusted and parameters that do not need to be adjusted when there is a change between different channel spacings are described below by using the following three types of AWGs as examples: an AWG made of an E7 liquid crystal material (referred to as a first-type AWG below for short), an AWG made of a liquid crystal material with a high refractive index (referred to as a second-type AWG below for short), and an AWG capable of adjusting a structure parameter of an arrayed waveguide region (a third-type AWG), as listed in Table 1.

this application is how to implement the change of the channel spacing of the AWG when a change of a refractive index of a waveguide region is relatively minor. Based on the foregoing examples and analysis of the angular dispersion equation and the grating equation of the AWG, it can be learned that there are mainly the following three scenarios:

(1) In a usual scenario, a change range of the refractive index of the waveguide region is limited (the change range of the refractive index is related to a material for manufacturing the optical waveguide in the waveguide region, and is between an extraordinary light refractive index and an ordinary light refractive index). Therefore, to satisfy the angular dispersion equation of the AWG, a diffraction order m needs to be adjusted when the channel spacing of the AWG is changed. In addition, the grating equation of the AWG needs to be satisfied. Because a diffraction angle is relatively small, $n_{si}*d_i*\sin\theta_i$ and $n_{so}*d_o*\sin\theta_o$ in the grating equation are both quantities with relatively small values. Therefore, a change of the diffraction order means that the refractive index $n_c$ of the arrayed waveguide region needs to be changed. For details, refer to the variable section of the first-type AWG in Table 1.

(2) In some scenarios (for example, the channel spacing varies between 62.5 GHz and 75 GHz (that is, a wavelength interval varies between 0.5 nm<->0.6 nm)). If a change range of refractive indexes of waveguide regions made of some materials is large enough, a diffraction order m does not need to be adjusted in this case. However, to satisfy the angular dispersion equa-

TABLE 1

| Channel spacing change (Unit: nm) | Variable | | | Invariant | | |
|---|---|---|---|---|---|---|
| | First-type AWG (only a refractive index of a waveguide region is adjusted) | Second-type AWG (only a refractive index of a waveguide is adjusted) | Third-type AWG (capable of adjusting a structure parameter of an arrayed waveguide region) | First-type AWG | Second-type AWG | Third-type AWG |
| 0.4<->0.8 | $n_{si}$, $n_c$, and m | $n_{si}$, $n_c$, and m | $n_{si}$, $n_c$, d, and $\Delta L$ | $n_{so}$, d, and $\Delta L$ | $n_{so}$, d, and $\Delta L$ | $n_{so}$ and m |
| 0.4<->0.6 | $n_{si}$, $n_c$, and m | $n_{si}$, $n_c$, $n_{so}$, and m | $n_{si}$, $n_c$, d, and $\Delta L$ | $n_{so}$, d, and $\Delta L$ | d and $\Delta L$ | $n_{so}$ and m |
| 0.4<->0.5 | $n_c$, $n_{so}$, and m | $n_{si}$, $n_c$, $n_{so}$, and m | $n_{si}$, $n_c$, d, and $\Delta L$ | $n_{si}$, d, and $\Delta L$ | d and $\Delta L$ | $n_{so}$ and m |
| 0.5<->0.8 | $n_{si}$, $n_c$, $n_{so}$, and m | $n_{si}$, $n_c$, $n_{so}$, and m | $n_{si}$, $n_c$, d, and $\Delta L$ | d and $\Delta L$ | d and $\Delta L$ | $n_{so}$ and m |
| 0.5<->0.6 | $n_{si}$, $n_c$, $n_{so}$, and m | $n_{si}$, $n_c$, and $n_{so}$ | $n_{si}$, $n_c$, d, and $\Delta L$ | d and $\Delta L$ | m, d, and $\Delta L$ | $n_{so}$ and m |
| 0.6<->0.8 | $n_c$ and m | $n_{si}$, $n_c$, $n_{so}$, and m | $n_{si}$, $n_c$, d, and $\Delta L$ | $n_{si}$, $n_{so}$, d, and $\Delta L$ | d and $\Delta L$ | $n_{so}$ and m |

It should be further noted that, the foregoing feasibility analysis is implemented on a basis that a diffraction angle in the input coupling region and/or a diffraction angle in the output coupling region that are/is corresponding to adjacent channel spacings are/is not changed when a channel spacing of an AWG is changed. To be specific, for a grating used for implementing a wavelength demultiplexing function, $\Delta\theta_o$ is not changed; for a grating used for implementing a wavelength multiplexing function, $\Delta\theta_i$ is not changed; and for a rotating AWG, neither $\Delta\theta_o$ nor $\Delta\theta_i$ is changed.

Based on the feasibility analysis in the foregoing two cases, it can be learned that a prerequisite for implementing tion, the refractive index $n_{so}$ of the output coupling region needs to be changed. In addition, to satisfy the grating equation, at least one of the refractive index $n_{si}$ of the input coupling region and the refractive index $n_c$ of the arrayed waveguide region needs to be changed. Refer to Equation set 1. A right-side value of an equation is not changed. In this case, if one parameter on a left side of the equation is changed, at least one parameter on the left side of the equation further needs to be changed, to ensure that the equation holds true.

(3) In some scenarios, a quantity of effective optical waveguides in the arrayed waveguide region may be selected (some optical waveguides are chosen to be eliminated), to change a periodicity d of the arrayed waveguide region and a length difference ΔL between two adjacent optical waveguides in the arrayed waveguide region. In this case, the diffraction order m and the refractive index $n_{so}$ of the output coupling region may not need to be adjusted. Similar to (1), to satisfy the grating equation, at least the refractive index $n_c$ of the arrayed waveguide region needs to be changed. Refer to Equation set 3.

It should be further noted that, the foregoing description is provided by only using the AWG as an example, but the foregoing analysis does not constitute any limitation on a type of the grating used in the grating characteristic adjustment method provided in embodiments of this application. The method provided in this application is not only applicable to the AWG, but also applicable to a rotating AWG. Because principles thereof are similar, feasibility of adjusting a characteristic of the rotating AWG is not analyzed in this application.

In conclusion, regardless of a type of grating, provided that the grating management device stores a value of each parameter corresponding to each channel spacing or stores a value of a parameter that needs to be changed when there is a change between any two channel spacings, the grating management device can perform adjustment on the grating based on the value of the parameter, and finally adjust a channel spacing of the grating, thereby implementing grating characteristic adjustment.

Figure 5:
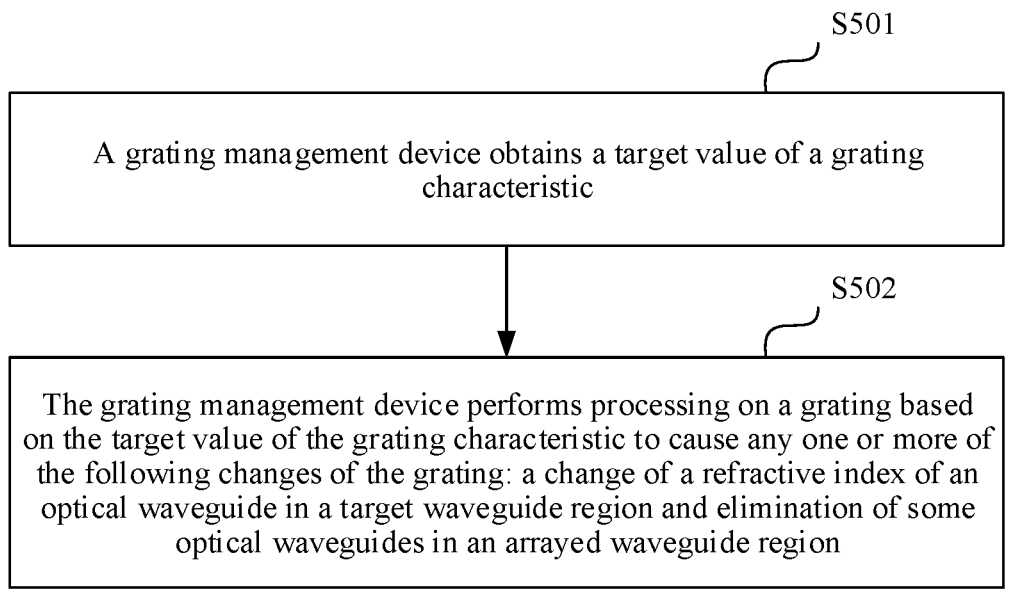
FIG. 5 is a flowchart of a grating characteristic adjustment method according to an embodiment of this application.

Based on the grating provided in the foregoing embodiment and the foregoing analysis of the feasibility of adjusting a grating characteristic, an embodiment of this application further provides a grating characteristic adjustment method. In this embodiment of this application, the grating includes a plurality of waveguide regions: a first optical waveguide region, a second optical waveguide region, and an arrayed waveguide region including a plurality of optical waveguides. In addition, the grating has any one or any combination of the following characteristics: a refractive index of an optical waveguide in the first optical waveguide region can be changed, a refractive index of an optical waveguide in the second optical waveguide region can be changed, a refractive index of an optical waveguide in the arrayed waveguide region can be changed, and an optical waveguide in the arrayed waveguide region can be eliminated. The grating further includes a control component, configured to change a refractive index of an optical waveguide in a target waveguide region and/or eliminate some optical waveguides in the arrayed waveguide region. The method is described below in detail with reference to a flowchart shown in FIG. 5.

S501: A grating management device obtains a target value of a grating characteristic, where the grating characteristic includes any one or more of a channel spacing, a spectral width of an input diffraction peak, and a spectral width of an output diffraction peak.

Optionally, the target value of the grating characteristic may be input by a user, or may be obtained by the grating management device from another device.

S502: The grating management device performs processing on the grating based on the target value of the grating characteristic to cause any one or more of the following changes of the grating: a change of a refractive index of an optical waveguide in a target waveguide region and elimination of some optical waveguides in the arrayed waveguide region, where the target waveguide region is any one or any combination of the first optical waveguide region, the second optical waveguide region, or the arrayed waveguide region.

Optionally, the grating may include a control component, configured to change the refractive index of the optical waveguide in the target waveguide region, and/or eliminate some optical waveguides in the arrayed waveguide region.

It can be learned from the description of the structure of the grating in the foregoing embodiment that, a refractive index of an optical waveguide in a waveguide region may be adjusted for the grating in a plurality of manners. Therefore, in this embodiment of this application, the grating management device performs S502 based on different grating structures through different implementations.

First implementation: In a scenario in which the structure of the grating is shown in FIG. 2E or FIG. 2F, the control component is an electrode layer. In this case, the grating management device may perform S502 according to the following step:

The grating management device supplies power to the electrode layer based on the target value of the grating characteristic to enable the electrode layer to provide a voltage or an electric field to the grating, thereby causing the foregoing changes of the grating.

Optionally, when the change of the grating includes the change of the refractive index of the optical waveguide in the target waveguide region, the grating management device may supply power to the electrode layer according to the following method:

a1: The grating management device determines a target refractive index of the target waveguide region based on the target value of the grating characteristic.

a2: The grating management device determines a target voltage of the electrode layer based on the target refractive index of the target waveguide region.

Optionally, the grating management device may determine the target voltage based on information such as a material for manufacturing the target waveguide region and the target refractive index. Alternatively, the grating management device stores a correspondence between a refractive index of the target waveguide region and a voltage of the electrode layer. Therefore, the grating management device may determine the target voltage of the electrode layer based on the target refractive index of the target waveguide region.

a3: The grating management device supplies power to the electrode layer based on the target voltage to enable the electrode layer to provide a voltage or an electric field to the target waveguide region in the grating.

Based on the foregoing analysis of the feasibility of adjusting a grating characteristic, it can be learned that, provided that the grating management device stores a value of each parameter corresponding to each channel spacing or stores a value of a parameter that needs to be changed when there is a change between any two channel spacings, the grating management device can perform adjustment on the grating based on the value of the parameter, and finally adjust a channel spacing of the grating, thereby implementing grating characteristic adjustment.

First implementation: The grating management device stores a first correspondence between each channel spacing (each value of the grating characteristic) and a target refractive index of each target waveguide region. In this way, regardless of which channel spacing the grating is adjusted to or which value the grating characteristic of the grating is adjusted to, the grating management device may determine, based on the first correspondence, at least one target waveguide region whose refractive index needs to be changed and the target refractive index of each target waveguide region.

In this implementation, when performing step a1, the grating management device may directly determine the target refractive index of each target waveguide region based on the target value of the grating characteristic and the first correspondence.

Second implementation: The grating management device stores a second correspondence between a channel spacing adjustment manner (adjusting from an original channel spacing to a target channel spacing) and a target refractive index of each target waveguide region. In this way, regardless of how a channel spacing of the grating is changed or which original value of the grating characteristic of the grating is adjusted to which target value, the grating management device may determine, based on the second correspondence, at least one target waveguide region whose refractive index needs to be changed and the target refractive index of each target waveguide region.

In this implementation, when performing step a1, the grating management device may determine the target refractive index of each target waveguide region based on an original value of the grating characteristic, the target value of the grating characteristic, and the second correspondence.

Further, regardless of which one of the foregoing implementations is used, when the electrode layer includes an electrode region corresponding to each optical waveguide in the plurality of waveguide regions, as shown in FIG. 2F, when performing step a2, the grating management device may determine, based on the target refractive index of each target waveguide region, a target voltage of an electrode region corresponding to an optical waveguide in each target waveguide region. In this way, when performing step a3, the grating management device can supply, based on the target voltage of the electrode region corresponding to the optical waveguide in each target waveguide region, power to the electrode region corresponding to the optical waveguide in each target waveguide region, so that the optical waveguide in each target waveguide region is affected by a corresponding voltage or electric field, and finally a refractive index of an optical waveguide in each target waveguide region is adjusted to a corresponding target refractive index.

Optionally, when the change of the grating includes elimination of some optical waveguides in the arrayed waveguide region, the grating management device may supply power to the electrode layer according to the following method:

b1: The grating management device determines a target value of a structure parameter of the arrayed waveguide region (for example, a periodicity d of the arrayed waveguide region and/or a length difference ΔL between two adjacent optical waveguides in the arrayed waveguide region) based on the target value of the grating characteristic.

b2: The grating management device determines, based on the target value of the structure parameter of the arrayed waveguide region, some optical waveguides in the arrayed waveguide region that need to be eliminated.

Optionally, the grating management device may determine some optical waveguides that need to be eliminated, based on various algorithms, the target value of the structure parameter of the arrayed waveguide region, and at least one or a combination of the following:

a manufacturing material, an insertion loss, channel crosstalk, a channel filtering spectral shape, and the like of the optical waveguide in the arrayed waveguide region.

Optionally, the grating management device may alternatively determine some optical waveguides that need to be eliminated, based on a stored correspondence between each value of the structure parameter of the arrayed waveguide region and an optical waveguide that needs to be eliminated and the target value of the structure parameter of the arrayed waveguide region.

b3: The grating management device supplies power to the electrode layer based on a preset voltage to enable the electrode layer to provide a voltage or an electric field to the some optical waveguides in the grating. The voltage and the electric field provided based on the preset voltage can cause the some optical waveguides to disappear.

It can be learned from the foregoing analysis of the feasibility of adjusting a grating characteristic that, when the refractive index of the optical waveguide in the arrayed waveguide region is variable, if refractive indexes of some optical waveguides in the arrayed waveguide region are adjusted to be smaller than a refractive index of a material of a coating layer, these optical waveguides are to disappear. In addition, some optical waveguides that need to be eliminated may be related to the target value of the structure parameter of the arrayed waveguide region.

First implementation: The grating management device stores a third correspondence between each channel spacing (each value of the grating characteristic) and a value of a structure parameter of the arrayed waveguide region. In this way, regardless of which channel spacing the grating is adjusted to or which value the grating characteristic of the grating is adjusted to, the grating management device may determine a target value of the structure parameter of the arrayed waveguide region based on the third correspondence.

Therefore, in this implementation, when performing step b1, the grating management device may directly determine the target value of the structure parameter of the arrayed waveguide region based on the target value of the grating characteristic and the third correspondence.

Second implementation: The grating management device stores a fourth correspondence between a channel spacing adjustment manner (adjusting from an original channel spacing to a target channel spacing) and a value of a structure parameter of the arrayed waveguide region. In this way, regardless of how a channel spacing of the grating is changed or which original value of the grating characteristic of the grating is adjusted to which target value, the grating management device may determine a target value of the structure parameter of the arrayed waveguide region based on the fourth correspondence.

In this implementation, when performing step b1, the grating management device may determine the target value of the structure parameter of the arrayed waveguide region based on an original value of the grating characteristic, the target value of the grating characteristic, and the fourth correspondence.

Further, regardless of which one of the foregoing implementations is used, when the electrode layer includes an electrode region corresponding to each optical waveguide in the arrayed waveguide region, as shown in FIG. 2F, when performing step b3, the grating management device may supply, based on the preset voltage, power to an electrode region corresponding to each of the some optical waveguides, to enable the electrode region corresponding to each optical waveguide to provide a voltage or an electric field to each corresponding optical waveguide. In this way, these optical waveguides are affected by the corresponding voltage or electric field, and finally these optical waveguides disappear.

Second implementation: In a scenario in which the structure of the grating is shown in FIG. 2G and FIG. 2H, the control component is a magnetic pole layer. In this case, the grating management device may perform S502 according to the following step:

The grating management device adjusts a magnetic field strength of the magnetic pole layer based on the target value of the grating characteristic to enable the magnetic pole layer to provide a magnetic field to the grating, thereby causing the foregoing changes of the grating.

Optionally, when the change of the grating includes the change of the refractive index of the optical waveguide in the target waveguide region, the grating management device may adjust the magnetic field strength of the magnetic pole layer according to the following method:

c1: The grating management device determines a target refractive index of the target waveguide region based on the target value of the grating characteristic.

c2: The grating management device determines a target magnetic field strength of the magnetic pole layer based on the target refractive index of the target waveguide region.

Optionally, the grating management device may determine the target magnetic field strength based on information such as a material for manufacturing the target waveguide region and the target refractive index. Alternatively, the grating management device stores a correspondence between a refractive index of the target waveguide region and the magnetic field strength of the magnetic pole layer. Therefore, the grating management device may determine the target magnetic field strength of the magnetic pole layer based on the target refractive index of the target waveguide region.

c3: The grating management device adjusts the magnetic field strength of the magnetic pole layer to the target magnetic field strength to enable the magnetic pole layer to provide a magnetic field to the target waveguide region in the grating, thereby finally causing the refractive index of the target waveguide region to be changed to the target refractive index.

First implementation: The grating management device stores the first correspondence.

In this implementation, when performing step c1, the grating management device may directly determine the target refractive index of each target waveguide region based on the target value of the grating characteristic and the first correspondence.

Second implementation: The grating management device stores the second correspondence.

In this implementation, when performing step c1, the grating management device may determine the target refractive index of each target waveguide region based on the original value of the grating characteristic, the target value of the grating characteristic, and the second correspondence.

Further, regardless of which one of the foregoing implementations is used, when the magnetic pole layer includes a magnetic pole region corresponding to each optical waveguide in the plurality of waveguide regions, as shown in FIG. 2H, when performing step c2, the grating management device may determine, based on the target refractive index of each target waveguide region, a target magnetic field strength of a magnetic pole region corresponding to an optical waveguide in each target waveguide region. In this way, when performing step c3, the grating management device can adjust, based on the target magnetic field strength of the magnetic pole region corresponding to the optical waveguide in each target waveguide region, a magnetic field strength of the magnetic pole region corresponding to the optical waveguide in each target waveguide region, so that the optical waveguide in each target waveguide region is affected by the corresponding magnetic field strength, and finally a refractive index of the optical waveguide in each target waveguide region is adjusted to a corresponding target refractive index.

Optionally, when the change of the grating includes elimination of some optical waveguides in the arrayed waveguide region, the grating management device may adjust the magnetic field strength of the magnetic pole layer according to the following method:

d1: The grating management device determines a target value of a structure parameter of the arrayed waveguide region (for example, a periodicity d of the arrayed waveguide region and/or a length difference ΔL between two adjacent optical waveguides in the arrayed waveguide region) based on the target value of the grating characteristic.

d2: The grating management device determines, based on the target value of the structure parameter of the arrayed waveguide region, some optical waveguides in the arrayed waveguide region that need to be eliminated.

In this implementation, the grating management device may alternatively determine, according to a plurality of methods, the some optical waveguides that need to be eliminated from the arrayed waveguide region. For details, refer to the description in the foregoing implementation. Details are not described herein again. d3: The grating management device adjusts the magnetic field strength of the magnetic pole layer to a preset magnetic field strength to enable the magnetic pole layer to provide a magnetic field to the some optical waveguides in the grating, thereby finally causing the some optical waveguides to disappear. The magnetic field provided based on the preset magnetic field strength can cause the some optical waveguides to disappear.

First implementation: The grating management device stores the third correspondence.

In this implementation, when performing step d1, the grating management device may directly determine the target value of the structure parameter of the arrayed waveguide region based on the target value of the grating characteristic and the third correspondence.

Second implementation: The grating management device stores the fourth correspondence.

In this implementation, when performing step d1, the grating management device may determine the target value of the structure parameter of the arrayed waveguide region based on an original value of the grating characteristic, the target value of the grating characteristic, and the fourth correspondence.

Further, regardless of which one of the foregoing implementations is used, when the magnetic pole layer includes a magnetic pole region corresponding to each optical waveguide in the arrayed waveguide region, as shown in FIG. 2H, when performing step d3, the grating management device may adjust a magnetic field strength of a magnetic pole region corresponding to each of the some optical waveguides to the preset magnetic field strength, to enable the magnetic pole region corresponding to each optical waveguide to provide a magnetic field to each corresponding optical waveguide. In this way, these optical waveguides are affected by the corresponding magnetic field, and finally these optical waveguides disappear.

Third implementation: In a scenario in which the structure of the grating is shown in FIG. 2I and FIG. 2J, the control component is a temperature control layer. In this case, the grating management device may perform S502 according to the following step:

The grating management device adjusts a temperature of the temperature control layer based on the target value of the grating characteristic to enable the temperature control layer to provide a temperature to the grating, thereby causing the foregoing changes of the grating.

Optionally, when the change of the grating includes the change of the refractive index of the optical waveguide in the target waveguide region, the grating management device may adjust the temperature of the temperature control layer according to the following method:

e1: The grating management device determines a target refractive index of the target waveguide region based on the target value of the grating characteristic.

e2: The grating management device determines a target temperature of the temperature control layer based on the target refractive index of the target waveguide region.

Optionally, the grating management device may determine the target temperature based on information such as a material for manufacturing the target waveguide region and the target refractive index. Alternatively, the grating management device stores a correspondence between a refractive index of the target waveguide region and the temperature of the temperature control layer. Therefore, the grating management device may determine the target temperature of the temperature control layer based on the target refractive index of the target waveguide region.

e3: The grating management device adjusts the temperature of the temperature control layer to the target temperature to enable the temperature control layer to provide the temperature to the target waveguide region in the grating, thereby finally causing the refractive index of the target waveguide region to be changed to the target refractive index.

First implementation: The grating management device stores the first correspondence.

In this implementation, when performing step c1, the grating management device may directly determine the target refractive index of each target waveguide region based on the target value of the grating characteristic and the first correspondence.

Second implementation: The grating management device stores the second correspondence.

In this implementation, when performing step c1, the grating management device may determine the target refractive index of each target waveguide region based on the original value of the grating characteristic, the target value of the grating characteristic, and the second correspondence.

Further, regardless of which one of the foregoing implementations is used, when the temperature control layer includes a temperature control region corresponding to each optical waveguide in the plurality of waveguide regions, as shown in FIG. 2J, when performing step e2, the grating management device may determine, based on the target refractive index of each target waveguide region, a target temperature of a temperature control region corresponding to an optical waveguide in each target waveguide region. In this way, when performing step e3, the grating management device can adjust a temperature of the temperature control region corresponding to the optical waveguide in each target waveguide region to a target temperature corresponding to the temperature control region, so that the optical waveguide in each target waveguide region is affected by the corresponding temperature, and finally a refractive index of the optical waveguide in each target waveguide region is adjusted to a corresponding target refractive index.

Optionally, when the change of the grating includes elimination of some optical waveguides in the arrayed waveguide region, the grating management device may adjust the temperature of the temperature control layer according to the following method:

f1: The grating management device determines a target value of a structure parameter of the arrayed waveguide region (for example, a periodicity d of the arrayed waveguide region and/or a length difference ΔL between two adjacent optical waveguides in the arrayed waveguide region) based on the target value of the grating characteristic.

f2: The grating management device determines, based on the target value of the structure parameter of the arrayed waveguide region, some optical waveguides in the arrayed waveguide region that need to be eliminated.

In this implementation, the grating management device may alternatively determine, according to a plurality of methods, the some optical waveguides that need to be eliminated from the arrayed waveguide region. For details, refer to the description in the foregoing implementation. Details are not described herein again.

f3: The grating management device adjusts the temperature of the temperature control layer to a preset temperature to enable the temperature control layer to provide the preset temperature to the some optical waveguides in the grating, thereby finally causing the some optical waveguides to disappear. The preset temperature can cause the some optical waveguides to disappear.

First implementation: The grating management device stores the third correspondence.

In this implementation, when performing step d1, the grating management device may directly determine the target value of the structure parameter of the arrayed waveguide region based on the target value of the grating characteristic and the third correspondence.

Second implementation: The grating management device stores the fourth correspondence.

In this implementation, when performing step d1, the grating management device may determine the target value of the structure parameter of the arrayed waveguide region based on an original value of the grating characteristic, the target value of the grating characteristic, and the fourth correspondence.

Further, regardless of which one of the foregoing implementations is used, when the temperature control layer includes a temperature control region corresponding to each optical waveguide in the arrayed waveguide region, as shown in FIG. 2J, when performing step f3, the grating management device may adjust a temperature of a temperature control region corresponding to each of the some optical waveguides to the preset temperature, to enable the temperature control region corresponding to each optical waveguide to provide the preset temperature to each corresponding optical waveguide. In this way, these optical waveguides are affected by the corresponding temperature, and finally these optical waveguides disappear.

An embodiment of this application provides a grating characteristic adjustment method. In this method, a grating management device may process a control component in a grating based on a target value of a grating characteristic to cause at least one of the following changes of the grating: a change of a refractive index of an optical waveguide in a target waveguide region and elimination of some optical waveguides in an arrayed waveguide region. In this way, the grating management device can change the grating characteristic.

Figure 6:
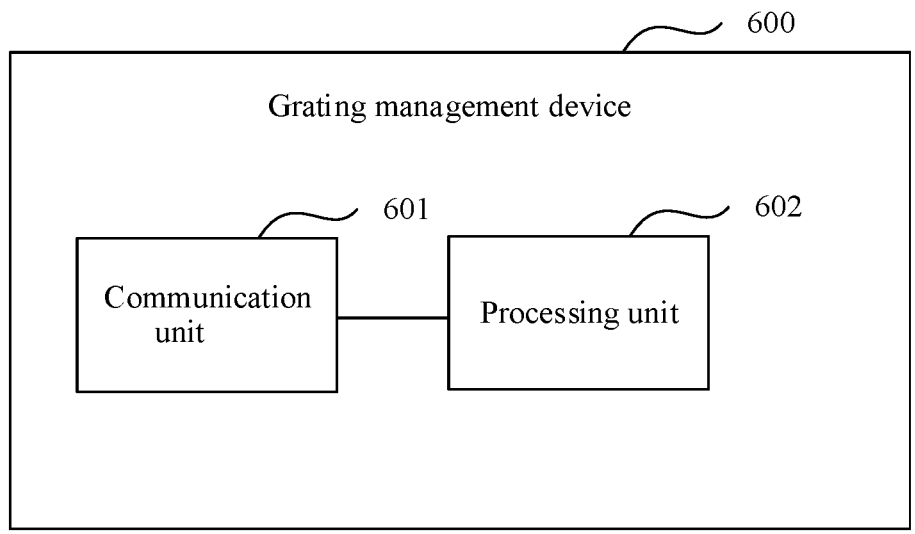
FIG. 6 is a structural diagram of a grating management device according to an embodiment of this application.

Based on a same technical concept, this application further provides a grating management device. The device can adjust the grating characteristic provided in the foregoing embodiment, and can implement the grating characteristic adjustment method shown in FIG. 5. As shown in FIG. 6, the grating management device 600 includes a communication unit 601 and a processing unit 602. Each unit is described in detail below.

The communication unit 601 is configured to: communicate with another device or component, and receive and send data.

The processing unit 602 is configured to: obtain a target value of a grating characteristic, where the grating characteristic includes any one or more of a channel spacing, a spectral width of an input diffraction peak, and a spectral width of an output diffraction peak; and perform processing on a grating based on the target value of the grating characteristic by using the communication unit 601, to cause any one or more of the following changes of the grating: a change of a refractive index of an optical waveguide in a target waveguide region and elimination of some optical waveguides in an arrayed waveguide region, where the target waveguide region is any one or any combination of a first optical waveguide region, a second optical waveguide region, or the arrayed waveguide region.

In an implementation, the grating further includes a control component; and the processing unit 602 is specifically configured to:

process the control component based on the target value of the grating characteristic to cause the any one or more of the following changes of the grating: the change of the refractive index of the optical waveguide in the target waveguide region and elimination of the some optical waveguides in the arrayed waveguide region.

In an implementation, the control component is an electrode layer; and when processing the control component based on the target value of the grating characteristic, the processing unit 602 is specifically configured to:

supply power to the electrode layer based on the target value of the grating characteristic to enable the electrode layer to provide a voltage or an electric field to the grating.

In an implementation, when the change of the grating includes the change of the refractive index of the optical waveguide in the target waveguide region, and when supplying power to the electrode layer based on the target value of the grating characteristic, the processing unit 602 is specifically configured to:

determine a target refractive index of the target waveguide region based on the target value of the grating characteristic;

determine a target voltage of the electrode layer based on the target refractive index of the target waveguide region; and supply power to the electrode layer based on the target voltage to enable the electrode layer to provide a voltage or an electric field to the target waveguide region in the grating.

In an implementation, when determining the target refractive index of the target waveguide region based on the target value of the grating characteristic, the processing unit 602 is specifically configured to:

determine the target refractive index of the target waveguide region based on an original value of the grating characteristic and the target value of the grating characteristic.

In an implementation, the electrode layer includes an electrode region corresponding to the optical waveguide in the target waveguide region; and when supplying power to the electrode layer based on the target voltage to enable the electrode layer to provide the voltage or the electric field to the target waveguide region in the grating, the processing unit 602 is specifically configured to:

supply, based on the target voltage, power to the electrode region that is at the electrode layer and that is corresponding to the optical waveguide in the target waveguide region, to enable the electrode region to provide a voltage or an electric field to the target waveguide region.

In an implementation, when the change of the grating includes elimination of some optical waveguides in the arrayed waveguide region, and when supplying power to the electrode layer based on the target value of the grating characteristic, the processing unit 602 is specifically configured to:

determine a target value of a structure parameter of the arrayed waveguide region based on the target value of the grating characteristic;

determine, based on the target value of the structure parameter of the arrayed waveguide region, some optical waveguides that need to be eliminated from the arrayed waveguide region; and supply power to the electrode layer based on a preset voltage to enable the electrode layer to provide a voltage or an electric field to the some optical waveguides in the grating.

In an implementation, when determining the target value of the structure parameter of the arrayed waveguide region based on the target value of the grating characteristic, the processing unit 602 is specifically configured to:

determine the target value of the structure parameter of the arrayed waveguide region based on an original value of the grating characteristic and the target value of the grating characteristic.

In an implementation, the electrode layer includes an electrode region corresponding to an optical waveguide in the arrayed waveguide region; and when supplying power to the electrode layer based on the preset voltage to enable the electrode layer to provide the voltage or the electric field to the some optical waveguides in the grating, the processing unit 602 is specifically configured to:

supply, based on the preset voltage, power to an electrode region that is at the electrode layer and that is corresponding to the some optical waveguides, to enable the electrode region to provide a voltage or an electric field to the some optical waveguides.

In an implementation, the control component is a magnetic pole layer; and when processing the control component based on the target value of the grating characteristic, the processing unit 602 is specifically configured to:

adjust a magnetic field strength of the magnetic pole layer based on the target value of the grating characteristic to enable the magnetic pole layer to provide a magnetic field to the grating.

In an implementation, when the change of the grating includes the change of the refractive index of the optical waveguide in the target waveguide region, and when adjusting the magnetic field strength of the magnetic pole layer based on the target value of the grating characteristic, the processing unit 602 is specifically configured to:

determine a target refractive index of the target waveguide region based on the target value of the grating characteristic;

determine a target magnetic field strength of the magnetic pole layer based on the target refractive index of the target waveguide region; and adjust the magnetic field strength of the magnetic pole layer to the target magnetic field strength to enable the magnetic pole layer to provide a magnetic field to the optical waveguide in the target waveguide region.

In an implementation, the magnetic pole layer includes a magnetic pole region corresponding to the optical waveguide in the target waveguide region; and when adjusting the magnetic field strength of the magnetic pole layer to the target magnetic field strength to enable the magnetic pole layer to provide the magnetic field to the optical waveguide in the target waveguide region, the processing unit 602 is specifically configured to:

adjust a magnetic field strength of the magnetic pole region corresponding to the optical waveguide in the target waveguide region to the target magnetic field strength, to enable the magnetic pole region to provide a magnetic field to the optical waveguide in the target waveguide region.

In an implementation, when the change of the grating includes elimination of some optical waveguides in the arrayed waveguide region, and when adjusting the magnetic field strength of the magnetic pole layer based on the target value of the grating characteristic, the processing unit 602 is specifically configured to:

determine a target value of a structure parameter of the arrayed waveguide region based on the target value of the grating characteristic;

determine, based on the target value of the structure parameter of the arrayed waveguide region, some optical waveguides that need to be eliminated from the arrayed waveguide region; and adjust the magnetic field strength of the magnetic pole layer to a preset magnetic field strength to enable the magnetic pole layer to provide a magnetic field to the some optical waveguides.

In an implementation, the magnetic pole layer includes a magnetic pole region corresponding to an optical waveguide in the arrayed waveguide region; and when adjusting the magnetic field strength of the magnetic pole layer to the preset magnetic field strength to enable the magnetic pole layer to provide the magnetic field to the some optical waveguides, the processing unit 602 is specifically configured to:

adjust a magnetic field strength of a magnetic pole region corresponding to the some optical waveguides to the preset magnetic field strength, to enable the magnetic pole region to provide a magnetic field to the some optical waveguides.

In an implementation, the control component is a temperature control layer; and when processing the control component based on the target value of the grating characteristic, the processing unit 602 is specifically configured to:

adjust a temperature of the temperature control layer based on the target value of the grating characteristic to enable the temperature control layer to provide a temperature to the grating.

In an implementation, when the change of the grating includes the change of the refractive index of the optical waveguide in the target waveguide region, and when adjusting the temperature of the temperature control layer based on the target value of the grating characteristic, the processing unit 602 is specifically configured to:

determine a target refractive index of the target waveguide region based on the target value of the grating characteristic;

determine a target temperature of the temperature control layer based on the target refractive index of the target waveguide region; and adjust the temperature of the temperature control layer to the target temperature to enable the temperature control layer to provide the temperature to the optical waveguide in the target waveguide region.

In an implementation, when the temperature control layer includes a temperature control region corresponding to the optical waveguide in the target waveguide region, and when adjusting the temperature of the temperature control layer to the target temperature to enable the temperature control layer to provide the temperature to the optical waveguide in the target waveguide region, the processing unit 602 is specifically configured to:

adjust a temperature of the temperature control region corresponding to the optical waveguide in the target waveguide region to the target temperature, to enable the temperature control region to provide the temperature to the optical waveguide in the target waveguide region.

In an implementation, when the change of the grating includes elimination of some optical waveguides in the arrayed waveguide region, and when adjusting the temperature of the temperature control layer based on the target value of the grating characteristic, the processing unit 602 is specifically configured to:

determine a target value of a structure parameter of the arrayed waveguide region based on the target value of the grating characteristic;

determine, based on the target value of the structure parameter of the arrayed waveguide region, some optical waveguides that need to be eliminated from the arrayed waveguide region; and adjust the temperature of the temperature control layer to a preset temperature to enable the temperature control layer to provide the temperature to the some optical waveguides.

In an implementation, when the temperature control layer includes a temperature control region corresponding to the optical waveguide in the arrayed waveguide region, and when adjusting the temperature of the temperature control layer to the preset temperature to enable the temperature control layer to provide the temperature to the some optical waveguides, the processing unit 602 is specifically configured to:

adjust a temperature of a temperature control region corresponding to the some optical waveguides to the preset temperature, to enable the temperature control region to provide the temperature to the some optical waveguides.

An embodiment of this application provides a grating management device. In this solution, the grating management device may process a control component in a grating based on a target value of a grating characteristic to cause at least one of the following changes of the grating: a change of a refractive index of an optical waveguide in a target waveguide region and elimination of some optical waveguides in an arrayed waveguide region. In this way, the grating management device can change the grating characteristic.

It should be noted that, module division in the foregoing embodiments of this application is an example, is merely logical function division, and may be other division in actual implementation. In addition, functional units in embodiments of this application may be integrated into one processing unit, or may exist alone physically. Alternatively, two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in the form of a software product. The computer software product is stored in a storage medium and includes several instructions for instructing a computer device (which may be a personal computer, a server, or a network device) or a processor (processor) to perform all or a part of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

Figure 7:
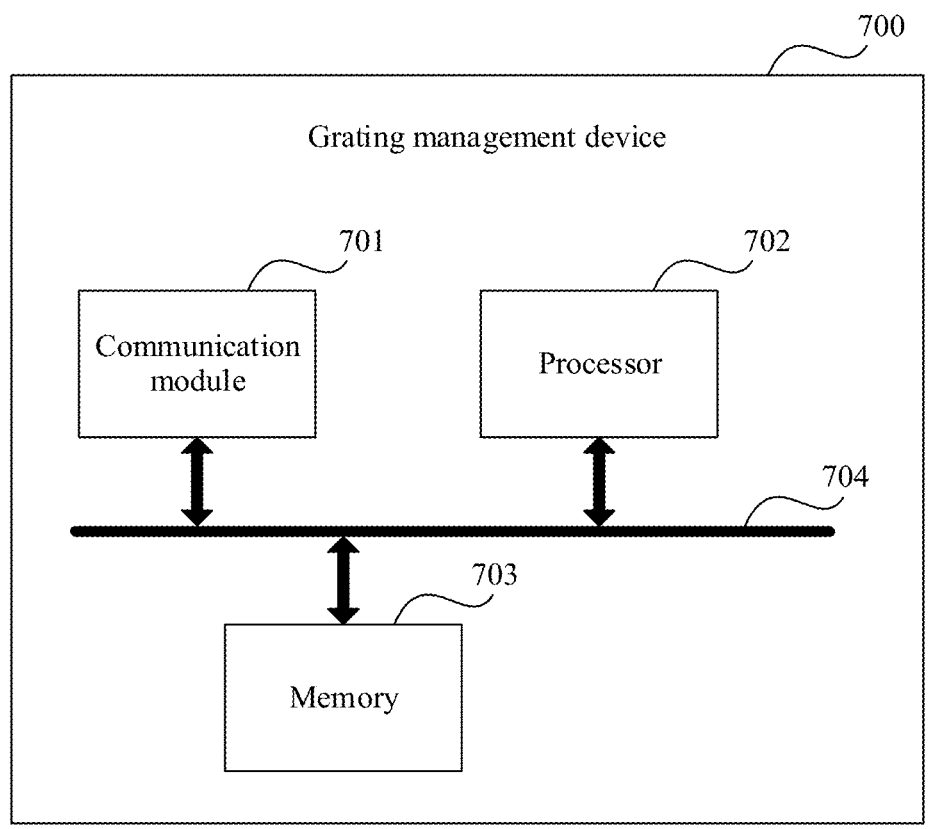
FIG. 7 is a structural diagram of another grating management device according to an embodiment of this application.

Based on a same technical concept, this application further provides a grating management device. The grating management device can adjust the grating characteristic provided in the foregoing embodiments, can implement the grating characteristic adjustment method shown in FIG. 5, and has a function of the grating management device shown in FIG. 6. As shown in FIG. 7, the grating management device 700 includes a communication module 701, a processor 702, and a memory 703. The communication module 701, the processor 702, and the memory 703 are connected to each other.

Optionally, the communication module 701, the processor 702, and the memory 703 are connected to each other by using a bus 704. The bus 704 may be a peripheral component interconnect (PCI) bus, an extended industry standard architecture (EISA) bus, or the like. The bus may be classified into an address bus, a data bus, a control bus, and the like. For ease of representation, only one bold line is used for representation in FIG. 7, but this does not mean that there is only one bus or only one type of bus.

The communication module 701 is configured to: receive and send data, and implement communication and interaction with another device or component. Optionally, the communication module 701 may include a transceiver and/or a physical interface. This is not limited in this application.

The processor 702 is specifically configured to:
obtain a target value of a grating characteristic, where the grating characteristic includes any one or more of a channel spacing, a spectral width of an input diffraction peak, and a spectral width of an output diffraction peak; and perform, by using the communication module 701, direct or indirect processing on a grating based on the target value of the grating characteristic to cause at least one of the following changes of the grating: a change of a refractive index of an optical waveguide in a target waveguide region and elimination of some optical waveguides in an arrayed waveguide region, where the target waveguide region is any one or any combination of a first optical waveguide region, a second optical waveguide region, or the arrayed waveguide region in the grating.

For a specific function of the processor 702, refer to the description in the grating characteristic adjustment method provided in the foregoing embodiment and the description of the specific function of the grating management device in the embodiment shown in FIG. 6. Details are not described herein again.

The memory 703 is configured to store program instructions, data, and the like. Specifically, the program instructions may include program code, and the program code includes computer operation instructions. The memory 703 may include a random access memory (RAM), or may further include a non-volatile memory (non-volatile memory), for example, at least one magnetic disk memory. The processor 702 executes the program instructions stored in the memory 703, and implements the foregoing function by using the data stored in the memory 703, thereby implementing the grating characteristic adjustment method provided in the foregoing embodiment.

It may be understood that the memory 703 in FIG. 7 in this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, a plurality of forms of RAMS may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification includes but is not limited to these and any memory of another appropriate type.

Based on the foregoing embodiments, an embodiment of this application further provides a computer program. When the computer program runs on a computer, the computer is enabled to perform the grating characteristic adjustment method provided in the foregoing embodiment.

Based on the foregoing embodiments, an embodiment of this application further provides a computer-readable storage medium. The computer-readable storage medium stores a computer program. When the computer program is executed by a computer, the computer is enabled to perform the grating characteristic adjustment method provided in the foregoing embodiment.

The storage medium may be any available medium accessible to a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can be used to carry or store expected program code in a form of instructions or a data structure and can be accessed by the computer.

Based on the foregoing embodiments, an embodiment of this application further provides a chip. The chip is configured to read a computer program stored in a memory, to implement the grating characteristic adjustment method provided in the foregoing embodiment.

Based on the foregoing embodiments, an embodiment of this application provides a chip system. The chip system includes a processor, configured to support a computer apparatus in implementing functions related to the grating management device in the foregoing embodiment. In a possible design, the chip system further includes a memory, and the memory is configured to store a program and data that are necessary for the computer apparatus. The chip system may include a chip, or may include a chip and another discrete component.

In conclusion, embodiments of this application provide the grating and the grating characteristic adjustment method and device. The grating has the following characteristic: a refractive index of an optical waveguide in at least one waveguide region can be changed and/or an optical waveguide in the arrayed waveguide region can be eliminated. Therefore, the grating management device may perform processing on the grating to change the refractive index of the optical waveguide in the target waveguide region and/or eliminate some optical waveguides in the arrayed waveguide region. In this way, at least one of the channel spacing, the spectral width of the input diffraction peak, and the spectral width of the output diffraction peak of the grating is changed, thereby finally changing the characteristic of the grating. Further, manufacturing costs and maintenance costs of the grating can be reduced during production and using of the grating.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A grating characteristic adjustment method, wherein:
  a grating comprises a first optical waveguide region, a second optical waveguide region, a control component comprising an electrode layer, and an arrayed waveguide region comprising a plurality of optical waveguides, the first optical waveguide region is connected to the arrayed waveguide region, and the second optical waveguide region is connected to the arrayed waveguide region; and
  the method comprises:
    obtaining a target value of a grating characteristic, wherein the grating characteristic comprises any one or more of a channel spacing, a spectral width of an input diffraction peak, or a spectral width of an output diffraction peak; and
    performing, based on the target value of the grating characteristic, processing on the grating to cause any one or more of the following changes of the grating: a change of a refractive index of an optical waveguide in a target waveguide region or elimination of one or more optical waveguides in the arrayed waveguide region, wherein:
      the target waveguide region is any one or any combination of the first optical waveguide region, the second optical waveguide region, or the arrayed waveguide region;
      the changes of the grating comprise the change of the refractive index of the optical waveguide in the target waveguide region; and
      the performing, based on the target value of the grating characteristic, processing on the grating comprises:
        determining a target refractive index of the target waveguide region based on the target value of the grating characteristic;

determining a target voltage of the electrode layer based on the target refractive index of the target waveguide region; and supplying a power to the electrode layer based on the target value of the grating characteristic, wherein the supplying comprises supplying the power to the electrode layer based on the target voltage to enable the electrode layer to provide a voltage or an electric field to the optical waveguide in the target waveguide region.

2. The grating characteristic adjustment method according to claim 1, wherein:

the electrode layer comprises an electrode region corresponding to the optical waveguide in the target waveguide region; and supplying the power to the electrode layer based on the target voltage to enable the electrode layer to provide the voltage or the electric field to the optical waveguide in the target waveguide region comprises:

supplying, based on the target voltage, power to the electrode region that is at the electrode layer and that is corresponding to the optical waveguide in the target waveguide region, to enable the electrode region to provide the voltage or the electric field to the optical waveguide in the target waveguide region.

3. The grating characteristic adjustment method according to claim 1, wherein the changes of the grating comprise the elimination of the one or more optical waveguides in the arrayed waveguide region, and supplying the power to the electrode layer based on the target value of the grating characteristic comprises:

determining a target value of a structure parameter of the arrayed waveguide region based on the target value of the grating characteristic;

determining, based on the target value of the structure parameter of the arrayed waveguide region, the one or more optical waveguides that need to be eliminated from the arrayed waveguide region; and supplying the power to the electrode layer based on a preset voltage to enable the electrode layer to provide one or more voltages or one or more electric fields to the one or more optical waveguides.

4. The grating characteristic adjustment method according to claim 3, wherein:

the electrode layer comprises an electrode region corresponding to the one or more optical waveguides in the arrayed waveguide region; and supplying the power to the electrode layer based on the preset voltage to enable the electrode layer to provide the one or more voltages or the one or more electric fields to the one or more optical waveguides comprises:

supplying, based on the preset voltage, power to the electrode region that is at the electrode layer and that is corresponding to the one or more optical waveguides, to enable the electrode region to provide the one or more voltages or the one or more electric fields to the one or more optical waveguides.

5. A grating characteristic adjustment method, wherein:

a grating comprises a first optical waveguide region, a second optical waveguide region, a control component comprising an electrode layer, and an arrayed waveguide region comprising a plurality of optical waveguides, the first optical waveguide region is connected to the arrayed waveguide region, and the second optical waveguide region is connected to the arrayed waveguide region; and the method comprises:

obtaining a target value of a grating characteristic, wherein the grating characteristic comprises any one or more of a channel spacing, a spectral width of an input diffraction peak, or a spectral width of an output diffraction peak; and performing, based on the target value of the grating characteristic, processing on the grating to cause any one or more of the following changes of the grating:

a change of a refractive index of an optical waveguide in a target waveguide region or elimination of one or more optical waveguides in the arrayed waveguide region, wherein:

the target waveguide region is any one or any combination of the first optical waveguide region, the second optical waveguide region, or the arrayed waveguide region;

the changes of the grating comprise the elimination of the one or more optical waveguides in the arrayed waveguide region; and performing, based on the target value of the grating characteristic, processing on the grating comprises:

determining a target value of a structure parameter of the arrayed waveguide region based on the target value of the grating characteristic;

determining, based on the target value of the structure parameter of the arrayed waveguide region, the one or more optical waveguides that need to be eliminated from the arrayed waveguide region; and supplying a power to the electrode layer based on the target value of the grating characteristic, wherein supplying power comprises supplying the power to the electrode layer based on a preset voltage to enable the electrode layer to provide one or more voltages or one or more electric fields to the one or more optical waveguides.

6. The grating characteristic adjustment method according to claim 5, wherein:

the electrode layer comprises an electrode region corresponding to the one or more optical waveguides in the arrayed waveguide region; and supplying the power to the electrode layer based on the preset voltage to enable the electrode layer to provide the one or more voltages or the one or more electric fields to the one or more optical waveguides comprises:

supplying, based on the preset voltage, power to the electrode region that is at the electrode layer and that is corresponding to the one or more optical waveguides, to enable the electrode region to provide the one or more voltages or the one or more electric fields to the one or more optical waveguides.

7. The grating characteristic adjustment method according to claim 5, wherein the changes of the grating comprise the change of the refractive index of the optical waveguide in the target waveguide region, and supplying the power to the electrode layer based on the target value of the grating characteristic comprises:

determining a target refractive index of the target waveguide region based on the target value of the grating characteristic;

determining a target voltage of the electrode layer based on the target refractive index of the target waveguide region; and supplying the power to the electrode layer based on the target voltage to enable the electrode layer to provide a voltage or an electric field to the optical waveguide in the target waveguide region.

8. The grating characteristic adjustment method according to claim 7, wherein:
the electrode layer comprises an electrode region corresponding to the optical waveguide in the target waveguide region; and
supplying the power to the electrode layer based on the target voltage to enable the electrode layer to provide the voltage or the electric field to the optical waveguide in the target waveguide region comprises:
supplying, based on the target voltage, power to the electrode region that is at the electrode layer and that is corresponding to the optical waveguide in the target waveguide region, to enable the electrode region to provide the voltage or the electric field to the optical waveguide in the target waveguide region.

9. A non-transitory computer-readable medium storing one or more instructions executable by a computer system to perform operations, wherein:
a grating comprises a first optical waveguide region, a second optical waveguide region, a control component comprising an electrode layer, and an arrayed waveguide region comprising a plurality of optical waveguides, the first optical waveguide region is connected to the arrayed waveguide region, and the second optical waveguide region is connected to the arrayed waveguide region; and
the operations comprise:
obtaining a target value of a grating characteristic, wherein the grating characteristic comprises any one or more of a channel spacing, a spectral width of an input diffraction peak, or a spectral width of an output diffraction peak; and
performing, based on the target value of the grating characteristic, processing on the grating to cause any one or more of the following changes of the grating: a change of a refractive index of an optical waveguide in a target waveguide region or elimination of one or more optical waveguides in the arrayed waveguide region, wherein:
the target waveguide region is any one or any combination of the first optical waveguide region, the second optical waveguide region, or the arrayed waveguide region;
the changes of the grating comprise the change of the refractive index of the optical waveguide in the target waveguide region; and
performing, based on the target value of the grating characteristic, processing on the grating comprises:
determining a target refractive index of the target waveguide region based on the target value of the grating characteristic;
determining a target voltage of the electrode layer based on the target refractive index of the target waveguide region; and
supplying a power to the electrode layer based on the target value of the grating characteristic, wherein supplying power comprises supplying the power to the electrode layer based on the target voltage to enable the electrode layer to provide a voltage or an electric field to the optical waveguide in the target waveguide region.

10. The non-transitory computer-readable medium according to claim 9, wherein:
the electrode layer comprises an electrode region corresponding to the optical waveguide in the target waveguide region; and
supplying the power to the electrode layer based on the target voltage to enable the electrode layer to provide the voltage or the electric field to the optical waveguide in the target waveguide region comprises:
supplying, based on the target voltage, power to the electrode region that is at the electrode layer and that is corresponding to the optical waveguide in the target waveguide region, to enable the electrode region to provide the voltage or the electric field to the optical waveguide in the target waveguide region.

11. The non-transitory computer-readable medium according to claim 9, wherein the changes of the grating comprise the elimination of the one or more optical waveguides in the arrayed waveguide region, and supplying the power to the electrode layer based on the target value of the grating characteristic comprises:
determining a target value of a structure parameter of the arrayed waveguide region based on the target value of the grating characteristic;
determining, based on the target value of the structure parameter of the arrayed waveguide region, the one or more optical waveguides that need to be eliminated from the arrayed waveguide region; and
supplying the power to the electrode layer based on a preset voltage to enable the electrode layer to provide one or more voltages or one or more electric fields to the one or more optical waveguides.

12. The non-transitory computer-readable medium according to claim 11, wherein:
the electrode layer comprises an electrode region corresponding to the one or more optical waveguides in the arrayed waveguide region; and
supplying the power to the electrode layer based on the preset voltage to enable the electrode layer to provide the one or more voltages or the one or more electric fields to the one or more optical waveguides comprises:
supplying, based on the preset voltage, power to the electrode region that is at the electrode layer and that is corresponding to the one or more optical waveguides, to enable the electrode region to provide the one or more voltages or the one or more electric fields to the one or more optical waveguides.

* * * * *